(12) United States Patent
Takemoto et al.

(10) Patent No.: US 9,771,273 B2
(45) Date of Patent: Sep. 26, 2017

(54) LITHIUM TITANATE POWDER, ACTIVE MATERIAL, AND ENERGY STORAGE DEVICE USING THE SAME

(71) Applicant: UBE INDUSTRIES, LTD., Ube-shi (JP)

(72) Inventors: Hirofumi Takemoto, Ube (JP); Yoshizumi Tanaka, Ube (JP); Hiroshi Fujino, Ube (JP); Yasumasa Iwamoto, Minato-ku (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 0 days.

(21) Appl. No.: 14/915,532

(22) PCT Filed: Aug. 29, 2014

(86) PCT No.: PCT/JP2014/072780
§ 371 (c)(1),
(2) Date: Feb. 29, 2016

(87) PCT Pub. No.: WO2015/030192
PCT Pub. Date: Mar. 5, 2015

(65) Prior Publication Data
US 2016/0204433 A1  Jul. 14, 2016

(30) Foreign Application Priority Data

Aug. 30, 2013 (JP) .................................. 2013-179829
Nov. 11, 2013 (JP) .................................. 2013-233353
May 21, 2014 (JP) .................................. 2014-105534

(51) Int. Cl.
| | |
|---|---|
| *H01M 4/485* | (2010.01) |
| *C01G 23/00* | (2006.01) |
| *H01M 4/131* | (2010.01) |
| *H01G 11/46* | (2013.01) |
| *H01G 11/50* | (2013.01) |
| *H01M 10/0525* | (2010.01) |
| *H01G 11/06* | (2013.01) |

(52) U.S. Cl.
CPC ............ *C01G 23/005* (2013.01); *H01G 11/46* (2013.01); *H01G 11/50* (2013.01); *H01M 4/131* (2013.01); *H01M 4/485* (2013.01); *C01P 2002/32* (2013.01); *C01P 2002/60* (2013.01); *C01P 2004/03* (2013.01); *C01P 2004/51* (2013.01); *C01P 2004/61* (2013.01); *C01P 2004/62* (2013.01); *C01P 2006/12* (2013.01); *C01P 2006/40* (2013.01); *H01G 11/06* (2013.01); *H01M 10/0525* (2013.01); *Y02E 60/13* (2013.01)

(58) Field of Classification Search
CPC .................................................. C01G 23/005
See application file for complete search history.

(56) References Cited

U.S. PATENT DOCUMENTS

| 2008/0254363 | A1* | 10/2008 | Matsui .............. H01M 10/0525 429/207 |
| 2013/0105730 | A1  | 5/2013  | Wagawa et al. |
| 2013/0244114 | A1  | 9/2013  | Yamamoto et al. |
| 2014/0312269 | A1* | 10/2014 | Laumann ............... C01G 23/00 252/182.1 |

FOREIGN PATENT DOCUMENTS

| JP | 2003-335519 A | 11/2003 |
| JP | 2004-235144 A | 8/2004 |
| JP | 4435926 B2 | 1/2010 |
| JP | 2012-6816 A | 1/2012 |
| JP | 2012-222266 A | 11/2012 |
| JP | 2013-51104 A | 3/2013 |
| JP | 2013-95646 A | 5/2013 |
| JP | 2013-234102 A | 11/2013 |
| WO | 2012/029697 A1 | 3/2012 |

OTHER PUBLICATIONS

International Search Report Issued Dec. 2, 2014 in PCT/JP14/72780 Filed Aug. 29, 2014.

* cited by examiner

*Primary Examiner* — Peter F Godenschwager
(74) *Attorney, Agent, or Firm* — Oblon, McClelland, Maier & Neustadt, L.L.P.

(57) ABSTRACT

Provided is a lithium titanate powder for an electrode of an energy storage device, the lithium titanate powder comprising $Li_4Ti_5O_{12}$ as a main component, wherein, when the volume surface diameter calculated from the specific surface area determined by the BET method is represented as $D_{BET}$ and the crystallite diameter calculated from the half-peak width of the peak of the (111) plane of $Li_4Ti_5O_{12}$ by the Scherrer equation is represented as $D_X$, $D_{BET}$ is 0.1 to 0.6 µm, $D_X$ is greater than 80 nm, and ($D_{BET}/D_X$ (µm/µm)) the ratio of $D_{BET}$ to $D_X$ is 3 or less. Also provided are an active material including the lithium titanate powder and an energy storage device using the active material.

20 Claims, 9 Drawing Sheets

LITHIUM TITANATE POWDER, ACTIVE MATERIAL, AND ENERGY STORAGE DEVICE USING THE SAME

TECHNICAL FIELD

The present invention relates to a lithium titanate powder preferable such as for an electrode material of an energy storage device, and to an active material including the lithium titanate powder and energy storage device using the active material in an positive electrode or negative electrode.

BACKGROUND ART

Recently, various types of materials have been studied as an electrode material for an energy storage device. Among the materials, lithium titanate is attracting attention for its superior input-output performance when used as an active material.

Patent Document 1 discloses lithium titanate containing $Li_{4/3}Ti_{5/3}O_4$ as a main component, having a main peak intensity of 5 or less in each of anatase-type titanium dioxide, rutile-type titanium dioxide, and $Li_2TiO_3$ when the intensity of the main peak for $Li_{4/3}Ti_{5/3}O_4$ determined by X-ray diffraction analysis using Cu target is defined to be 100, and with high crystallinity having a crystallite diameter of 700 Å to 800 Å (70 nm to 80 nm), which is determined from a half-peak width of the peak in 4.83 Å with the Scherrer equation. According to Patent Document 1, high initial charge-discharge capacity is achieved by the peak intensity being as small as 5 or less in lithium titanate components other than $Li_4Ti_5O_{12}$ and very high crystallinity having a crystallite diameter of within the range of 70 nm to 80 nm.

Patent Document 2 discloses a lithium-titanium complex oxide containing $Li_4Ti_5O_{12}$ as a main component, and when the main peak intensity detected for each phase of $Li_4Ti_5O_{12}$, $Li_2TiO_3$, and $TiO_2$ in the X-ray diffraction pattern is I1, I2, and I3 respectively, achieving I1/(I1+I2+I3) of 96% or more, and also having a crystallite diameter, which is determined from the half-peak width of the peak in the X-ray diffraction pattern for the (111) plane of $Li_4Ti_5O_{12}$ with the Scherrer equation, of 520 Å to 590 Å (52 nm to 59 nm). Patent Document 2 also discloses that a lithium-titanium complex oxide preferably has a ratio of a specific surface area equivalent diameter determined by the BET method to the crystallite diameter, that is a specific surface area equivalent diameter/crystallite diameter, of 4 or less, further preferably, has a specific surface area determined by the BET method of 8 to 12 $m^2/g$ and maximum primary particle diameter of 1.5 μm or less. According to Patent Document 2, lithium-titanium complex oxide having a crystallite diameter within the above range can form fine particles while having high crystallinity, and is considered to exhibit high-rate performance while having a high initial capacity of 160 mAh/g for example.

RELATED DOCUMENT

Patent Document

Patent Document 1: JP 4435926
Patent Document 2: JP 2013-95646 A

SUMMARY OF INVENTION

Problems to be Solved by Invention

A lithium-ion secondary battery manufactured by using lithium titanate of Patent Document 1 as a positive electrode active material, as described in paragraph [0012] of Patent Document 1, lithium titanate of Patent Document 1 has high initial charge-discharge capacity due to large crystallite diameter of lithium titanate as large as 773 Å at the maximum.

However, by using lithium titanate of Patent Document 1, input-output performance as a battery is inferior due to larger primary particle diameter along with larger crystallite diameter, as pointed out in paragraph [0005] of Patent Document 2. Also, as pointed out in paragraph [0005] of Patent Document 2, although primary particle diameter can be made smaller by milling obtained lithium titanate, in such a case, crystallite diameter also becomes small.

The lithium-titanium complex oxide of Patent Document 2, having BET diameter (volume surface diameter)/crystallite diameter of 2.4 to 3.1, is a powder having a smaller BET diameter compared to a crystallite diameter, that it is considered to have satisfactory input-output performance for a battery. However, its crystallite diameter is 558 Å at the maximum, thus the initial charge-discharge capacity becomes small. Although, it is said that a milling method that can suppress decrease in crystallite diameter is used, it can be estimated that the crystallite diameter became small due to the milling after calcination.

As above, a lithium titanate powder having large initial charge-discharge capacity and superior input performance when it is used for energy storage devices such as a lithium-ion battery as an electrode material has not been obtained yet.

To solve above problems, an objective of the present invention is to provide a lithium titanate powder that exhibits a large initial charge-discharge capacity and superior input-output performance when it is used as electrode material of energy storage devices, an active material including the lithium titanate powder, and an energy storage device using the active material.

Means for Solving Problems

The present inventors have studied intensively to achieve the above-mentioned objectives, and finally have found lithium titanate powder having specific size of BET diameter (volume surface diameter) and crystallite diameter, and in which the size of the BET diameter relative to the crystallite diameter is equal to or less than a specific value. The inventors have also found that an energy storage device obtained by using the lithium titanate powder as an electrode material exhibits large initial charge-discharge capacity and superior input-output performance, and thus completed the invention. Accordingly, the present invention relates to the following items.

(1) A lithium titanate powder containing $Li_4Ti_5O_{12}$ as a main component, wherein, when volume surface diameter calculated from specific surface area determined by the BET method is represented as $D_{BET}$, and when crystallite diameter calculated from half-peak width of the peak for the (111) plane of $Li_4Ti_5O_{12}$ by the Scherrer equation is represented as $D_X$, $D_{BET}$ is 0.1 to 0.6 μm, $D_X$ is larger than 80 nm, and ratio $D_{BET}/D_X$ (μm/μm) of $D_{BET}$ to $D_X$ is 3 or less.

(2) The lithium titanate powder according to (1), wherein the ratio $D_{BET}/D_X$ (μm/μm) of $D_{BET}$ to $D_X$ is 2 or less.

(3) The lithium titanate powder according to (1) or (2), wherein $D_X$ is 500 nm or less.

(4) The lithium titanate powder according to any one of (1) to (3) containing M (wherein M is at least one type of metal element selected from the group consisting of group 2 element, group 12 element, and group 13 element).

(5) The lithium titanate powder according to (4), wherein the M is at least one type of metal element selected from the group consisting of Mg, Zn, Al, Ga, and In.

(6) The lithium titanate powder according to any one of (1) to (5), wherein $T_M/T_{Ti}$, atomic ratio of M to Ti for the entire lithium titanate powder measured by the inductively coupled plasma emission spectrometric analysis method is 0.001 to 0.05.

(7) The lithium titanate powder according to any one of (1) to (6), wherein, in a cross-sectional analysis of a lithium titanate particle using a scanning transmission electron microscope, when an element concentration of the M measured by an energy dispersive X-ray spectroscopy at the 5 nm inner position from a surface of the lithium titanate particle along straight line drawn vertically to tangent of the lithium titanate particle surface is D1 (atm %) and when an element concentration of the M measured by an energy dispersive X-ray spectroscopy at 100 nm inner position from the lithium titanate particle surface along the straight line is D2 (atm %), the D1 and D2 satisfy the following formula (I).

$$D1 > D2 \quad (I)$$

(8) The lithium titanate powder according to (7), wherein a ratio D1/D2 of the D1 to the D2 satisfies the following formula (II).

$$D1/D2 \geq 5 \quad (II)$$

(9) The lithium titanate powder according to any one of (1) to (8) containing a fluorine element.

(10) The lithium titanate powder according to any one of (1) to (9) for use in an electrode of an energy storage device.

(11) The lithium titanate powder according to any one of (1) to (10) for use in an electrode of a lithium-ion secondary battery.

(12) The lithium titanate powder according to any one of (1) to (10) for use in an electrode of a hybrid capacitor.

(13) An active material containing a lithium titanate powder according to any one of (1) to (12).

(14) An energy storage device, wherein an active material according to (13) is used.

(15) A lithium-ion secondary battery, wherein an active material according to (13) is used.

(16) A hybrid capacitor, wherein an active material according to (13) is used.

Effect of Invention

In accordance with the present invention, there can be provided lithium titanate powder suitable for use as an electrode material such as for energy storage devices having large initial charge-discharge capacity and superior input-output performance, an active material, and an energy storage device.

MODES FOR CARRYING OUT THE INVENTION

[Lithium Titanate Powder]

Figure 1:
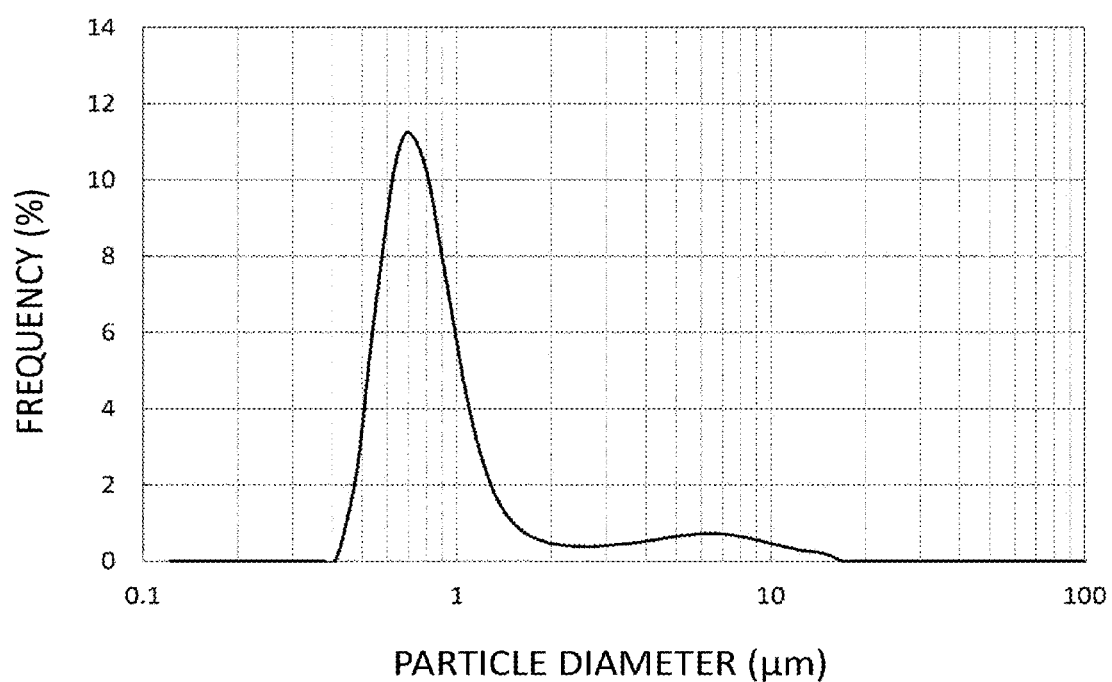
FIG. 1 is a particle size distribution curve of a mixed powder in the mixed slurry before milling in Example 1.

The lithium titanate powder of the present invention is containing $Li_4Ti_5O_{12}$ as a main component, and when volume surface diameter calculated from specific surface area determined by the BET method is represented as $D_{BET}$ and crystallite diameter calculated from half-peak width of the peak for the (111) plane of $Li_4Ti_5O_{12}$ by the Scherrer equation is represented as $D_X$, $D_{BET}$ is 0.1 to 0.6 μm, $D_X$ is larger than 80 nm, and $D_{BET}/D_X$ (μm/μm), ratio of $D_{BET}$ to $D_X$ is 3 or less.

Here, containing $Li_4Ti_5O_{12}$ as a main component means that, when peak intensity that corresponds to the main peak of $Li_4Ti_5O_{12}$ among the peaks measured by the X-ray diffraction analysis is defined to be 100, the main peak intensity of anatase-type titanium dioxide is 5 or less, the main peak intensity of rutile-type titanium dioxide is 5 or less, and the peak intensity that corresponds to the main peak of $Li_2TiO_3$ is 5 or less. However, if such components other than $Li_4Ti_5O_{12}$ exist, the content amount of $Li_4Ti_5O_{12}$ relatively decreases and thus causes smaller charge-discharge capacity and inferior high-rate performance. Accordingly, the content amount of such components other than $Li_4Ti_5O_{12}$ should preferably be kept small. Particularly, since rutile-type titanium dioxide brings significant undesirable influences in charge-discharge capacity and high-rate performance, main peak intensity of rutile-type titanium dioxide is preferably 3 or less.

For the lithium titanate powder of the present invention, Li/Ti, an atomic ratio of Li to Ti is preferably 0.79 to 0.85. When the atomic ratio is within this range, the ratio of $Li_4Ti_5O_{12}$ in the lithium titanate powder increases and the initial charge-discharge capacity of an energy storage device where the lithium titanate powder of the present invention is applied as the electrode material increases. From this point of view, the atomic ratio Li/Ti is more preferably 0.80 to 0.85, and further preferably 0.81 to 0.85.

In the present invention, a crystallite diameter calculated from a half-peak width of the peak of (111) plane of $Li_4Ti_5O_{12}$ by the Scherrer equation is represented as $D_X$. $D_X$ of the lithium titanate powder in the present invention is larger than 80 nm, preferably 90 nm or more, more preferably 100 nm or more, particularly preferably 200 nm or more. As $D_X$ becomes larger, the initial charge-discharge capacity of the energy storage device for which the lithium titanate powder of the present invention is applied as an electrode material, increases. Further, $D_X$ of the lithium titanate powder of the present invention is preferably 500 nm or less. When $D_X$ becomes larger than 500 nm, $D_{BET}$ may increase and may result inferior in input-output performance. The measurement method for $D_X$ is explained later at "(2) Crystallite diameter $(D_X)$" in [Method of measuring physical properties].

In the present invention, volume surface diameter of the lithium titanate powder of the present invention calculated from specific surface area determined by BET method is represented as $D_{BET}$. $D_{BET}$ of the lithium titanate powder of the present invention is 0.1 pin to 0.6 μm, preferably 0.2 μm to 0.5 μm, further preferably 0.3 μm to 0.5 μm. A measurement method of $D_{BET}$ is explained later at "(5) BET diameter $(D_{BET})$" in [Method of measuring physical properties], where it is a value calculated from a BET specific surface area of the lithium titanate powder in the present invention as explained in <BET specific surface area> below.

$D_{BET}/D_X$ (μm/μm), the ratio of $D_{BET}$ to $D_X$ of the lithium titanate powder of the present invention is 3 or less. Preferably, $D_{BET}/D_X$ is 2 or less, and more preferably 1.5 or less. As $D_{BET}/D_X$ becomes close to 1, the crystal structure of each individual lithium titanate particle constituting lithium titanate powder comes close to structure constituted by crystallite with same orientation, and thus grain boundaries almost disappear from inside of the particle. As a result, input-output performance of an energy storage device for which the lithium titanate powder of the present invention is applied as an electrode material is improved. The crystal structure of the lithium titanate particle can be confirmed with a selected-area diffraction pattern measurement in cross-sectional analysis of the lithium titanate particle using a scanning transmission electron microscope.

The lithium titanate powder in the present invention may substantially be composed only of Li, Ti, and O, or may include any different element other than Li, Ti, or O. Preferably, the lithium titanate powder in the present invention contains M as a different element (wherein M is at least one type of metal element selected from the group consisting of group 2 element, group 12 element, and group 13 element). This is because, by including these elements, input performance, particularly charge capacity ratio at low temperature is improved. As for M, at least one type of metal element selected from the group consisting of Mg, Zn, Al, Ga, and In is more preferable. Mg, Zn, Al, Ga, and In are the metal elements where their Pauling's ionic radius is within ±20 pm range from Pauling's ionic radius for $Ti^{4+}$ (that is, within 68 pm±20 pm range since Pauling's ionic radius for $Ti^{4+}$ is 68 pm), and have different ion valence from that of $Ti^{4+}$. For these reasons, it is speculated that these metal elements improve diffusion speed of Li ions and also have an effect of improving input performance, particularly at low temperatures.

Regarding the content amount of M, $T_m/T_{Ti}$, atomic ratio of M to Ti for the entire lithium titanate powder measured by the inductivity coupled plasma emission spectrometric analysis is preferably 0.001 to 0.05. Particularly preferably, the lower limit value for $T_m/T_{Ti}$ is 0.01 or more, and the upper limit value is 0.03 or less.

Preferably, M is contained more in the surface region than in the inner region of each individual lithium titanate particle constituting lithium titanate powder. For example, in cross-sectional analysis of a lithium titanate particle using a scanning transmission electron microscope, when element concentration of M measured by energy dispersive X-ray spectroscopy (EDS) at the 5 nm inner position from the surface of the lithium titanate particle along a straight line drawn vertically to tangent of the lithium titanate particle surface is D1 (atm %), and when element concentration of M measured by energy dispersive X-ray spectroscopy (EDS) at the 100 nm inner position from the lithium titanate particle surface along the straight line is D2 (atm %), the D1 and D2 preferably satisfy the following formula (1)

$$D1 > D2 \tag{1}$$

Also, when $T_M/T_{Ti}$, atomic ratio of M to Ti in the entire lithium titanate powder measured by the inductively coupled plasma emission spectrometric analysis method is represented as A, and when $C_M/C_{Ti}$, atomic ratio of M to Ti on the surface of lithium titanate powder measured by X-ray photoelectron spectroscopy is represented as B, A and B preferably satisfy following formula (2). As for X-ray photoelectron spectroscopy, a method that uses Mg-Kα ray for an X-ray source or the like can be mentioned.

$$B/A \geq 1.5 \tag{2}$$

As above mentioned, when M is contained more in the surface region than in the inner region of a lithium titanate particle constituting lithium titanate powder, input performance at low temperature is further improved.

In order to further improve input performance at low temperatures, D1/D2, ratio of D1 to D2 mentioned above, preferably satisfies following formula (3).

$$D1/D2 \geq 5 \tag{3}$$

Likewise, in order to further improve input performance at low temperatures, B/A mentioned above, preferably satisfies following formula (4).

$$B/A > 5 \tag{4}$$

<Volume-Median Particle Diameter>

The lithium titanate powder of the present invention can be either powder obtained without granulation operation or powder obtained after granulation operation performed before or after calcination. If it is a powder obtained without granulation operation, the volume-median particle diameter (average particle diameter, hereafter indicated as D50) of the lithium titanate powder of the present invention is 0.01 to 2 μm. In order to suppress aggregation of the lithium titanate powder and to improve its handling during preparation of electrode, D50 for the lithium titanate powder of the present invention obtained without granulation is preferably 0.1 μm or more, and 1 μm or less to improve input-output performance. From these points, D50 of the lithium titanate powder of the present invention obtained without granulation operation is more preferably 0.1 to 1 μm, further preferably 0.2 to 0.9 μm. On the other hand, if it is the powder obtained after granulation operation, D50 of the lithium titanate powder in the present invention is preferably 50 μm or less.

Here, D50 indicates a particle diameter where a volume cumulative frequency calculated in volume fraction becomes 50% when integrated from smaller particles. The measurement method is explained later at "(3) Volume-median particle diameter (D50)" in [Method of measuring physical properties].

<BET Specific Surface Area>

From the perspective of improving input-output performance, a BET specific surface area of the lithium titanate powder in the present invention (hereafter may be simply called as "specific surface area") is preferably 3 $m^2/g$ or more, and more preferably 5 $m^2/g$ or more. Further, from the perspective of reducing the solvent amount used in preparation of slurry when dispersing lithium titanate powder to solvent at the process of manufacturing electrode, the specific surface area is further preferably W $m^2/g$ or less.

<pH>

The pH of the lithium titanate powder in the present invention is preferably 7 to 12. If pH is 7 or more, an advantage of good dispersibility can be obtained, and if it is 12 or less, an advantage of avoiding a problem of slurry gelation when preparing an electrode. From these points, the upper limit value is preferably 11.5 or less, and more preferably 11 or less. Here, the pH of the lithium titanate powder indicates that of supernatant of dispersion liquid prepared by 10 g of lithium titanate powder dispersed to 90 g of water.

[Method of Manufacturing Lithium Titanate Powder]

The lithium titanate powder of the present invention can be obtained through a milling and mixing process of raw materials, a calcination process at high temperature in short time (short-time high-temperature), and post-processing processes such as deagglomaration, classification, and magnetic separation.

When raw materials are simply mixed, reaction does not proceed sufficiently in short-time high-temperature calcination, thus different phases such as $Li_2TiO_3$ and rutile-type titanium dioxide are formed in the obtained lithium titanate powder. As these different phases cause decrease in charge-discharge capacity, it is essential to obtain a lithium titanate powder with less different phases even by short-time high-temperature calcination. For this purpose, Ti source and Li source of raw materials (titanium compound and lithium compound) need to be mixed sufficiently. To mix sufficiently, particle size of lithium compound has to be particularly small.

<Preparation Process of Raw Material Mixture of Ti and Li Source>

As Ti source for the lithium titanate powder of the present invention, titanium compounds, for example, titanate ester such as titanate tetraisopropyl, oxy-hydroxide titanium, anatase-type titanium dioxide, and rutile-type titanium dioxide are used. It is preferable that Li source reacts easily with Ti source in a short time, and from this point of view, anatase-type titanium dioxide is preferable. The volume-median particle diameter of Ti source (average particle diameter, D50) is 0.01 to 2 μm. In order to ensure sufficient reaction of raw materials in a short time, 2 μm or less is preferable, and to improve handling properties, 0.1 μm or more is preferable. From these points, D50 is more preferably 0.1 to 2 μm.

As for the Li source of the lithium titanate powder in the present invention, lithium compounds such as lithium hydroxide monohydrate, lithium oxide, lithium hydrogencarbonate, and lithium carbonate are used. In the perspective of calcining at a high temperature, a lithium compound with higher melting point is preferable, and lithium carbonate is particularly preferable.

If the lithium titanate powder of the present invention is a lithium titanate powder containing M, then as a M source, a compound containing M can be used as raw material in addition to Ti source and Li source. As for the compound containing M, any compound, for example, an oxide, a hydroxide, or a metal salt compound containing M can be used. If the compound is a metal salt compound containing M, an anionic species that does not remain after calcination is suitable from the viewpoint of achieving higher charge-discharge capacity. For example, an organic acid compound containing M and a nitric acid compound containing M etc, are preferable.

In the present invention, a mixture containing above raw materials is prepared so as to achieve D95 of the mixed powder at particle size distribution curve measured by a laser diffraction/scattering particle size analyzer becomes 5 μm or less before calcination. Here, D95 means the particle diameter where volume cumulative frequency calculated in volume fraction becomes 95% when integrated from smaller particles. The mixture can be a mixed powder prepared as above, or a granulated powder obtained by granulation of the mixed powder prepared as above. Further, the mixture for calcining can be in a form of slurry including the mixed powder or granulated powder above. If the mixture is a granulated powder, D95 of the granulated powder does not need to be 5 μm or less as long as it is the granulated powder obtained by granulating the mixed powder having D95 of 5 μm or less.

As for a preparation method of a mixture, the following methods can be adopted. The first method is that the compounded raw materials are mixed and milled simultaneously. The second method is that lithium compound raw material is milled until its D95 after mixing becomes 5 μm or less and then either simply mixed or mixed with light milling. The third method is that fine particle of lithium compound is first prepared by crystallizing the lithium compound as a raw material or the like, classified as required, and then simply mixed or mixed with light milling. Among these methods, the first method where raw materials are milled and mixed simultaneously is industrially beneficial as it has fewer processes. Further, a conductive agent may be added at the same time.

If the lithium titanate powder of the present invention is a lithium titanate powder containing M, a compound containing M can be mixed with titanium compound and lithium compound simultaneously in the above preparation method of a mixture.

In any of the first to third methods above, there are no particular restrictions to the mixing method of raw materials, either wet or dry mixing can be used. For example, Henschel mixer, ultrasonic dispersing apparatus, homo mixer, mortar, ball mill, centrifugal ball mill, planetary ball mill, vibratory ball mill, attritor type high-speed ball mill, bead mill, roll mill, etc., can be used.

If the obtained mixture is a mixed powder, it can be used for next calcination process as it is. If the obtained mixture is mixed slurry containing the mixed powder, then it can be used for next calcination process after dried and granulated with a spray dryer or the like. If a rotary kiln is used for calcination, then the mixed slurry can be used as it is.

<Calcination Process>

The following is the calcination of the mixture. In the perspective of making particle size of powder obtained by calcination smaller and the crystallite diameter larger, preferably calcination is done in a short-time high-temperature. From this viewpoint, calcination temperature is preferably 800 to 1100° C., more preferably 850 to 1100° C., and further preferably 900 to 1000° C. Similarly, from the viewpoint above, a time for retaining 800° C. or more during calcination is preferably 2 to 90 minutes, more preferably 5 to 60 minutes, and further preferably 5 to 45 minutes. If a calcination temperature is high, a shorter calcination time is selected. Likewise, from the viewpoint above, in a heat-up process during calcination, length of time stayed within 700 to 800° C. particularly short, for example, 15 minutes or less, is necessary.

The calcination method is not particularly limited, as long as it can be calcine at above conditions. As for calcination furnace, a fixed-bed furnace, a roller-hearth kiln, a mesh-belt kiln, a fluidized-bed furnace, and a rotary kiln can be used. However, to perform calcination efficiently in a short time, a roller-hearth kiln, a mesh-belt kiln, or a rotary kiln is preferable. If a roller-hearth kiln or mesh-belt kiln in which a mixture is stored in a saggar for calcination is used, the amount of mixture contained in the saggar is preferably kept small in order to keep lithium titanate quality stable, which is achieved by keeping temperature distribution of the mixture uniform during calcination.

The rotary kiln is particularly preferable for manufacturing lithium titanate powder of the present invention from the perspective of no need of containers for storing mixture so that mixture can be added continuously, and uniform heat history to the calcined object so as to obtain homogenous lithium titanate powder.

There is no particular limitation to calcination atmosphere in any calcination furnaces as long as desorbed water and carbon dioxide can be eliminated from the atmosphere. Generally, an atmosphere with compressed air is used, however, oxygen, nitrogen, or hydrogen atmosphere, etc, may be used.

<Post-Processing Process>

The lithium titanate powder after calcination obtained as above has slight aggregation but does not require such milling to break particles, and only deagglomeration and classification that disentangle aggregation are applied as needed.

The lithium titanate powder of the present invention has a large crystallite diameter, since crystallite size after calcination is large and kept large without degradation by milling after calcination.

A mixture of the present invention is composed of a mixed powder where Ti source and Li source, or Ti source, Li source, and M source if M source is added as a raw material, are mixed uniformly, and where relatively large particles are few. Specifically, the mixture is composed of a mixed powder prepared to have D95 of 5 μm or less, or a granulated powder of the said mixed powder. If the mixture containing a mixed powder, where particle size distribution is not adjusted, is calcined at short-time high-temperature, a lithium titanate powder having a large crystallite diameter can be obtained, however, the ratio of different phases such as $Li_2TiO_3$ and rutile-type titanium dioxide is increased. Thus, charge-discharge capacity decreases. Whereas, if calcination time is made longer, the content amount of different phases decreases, but a BET diameter becomes large and the lithium titanate powder of the present invention cannot be obtained.

It is speculated that, in the present invention, lithium titanate powder with large crystallite diameter and with smaller BET diameter compared to crystallite diameter is obtained for the following reasons.

A calcination temperature between 700 and 800° C. is the temperature range where crystal nucleuses of lithium titanate start to generate. It is speculated that in the present invention, making the length of time stayed within the temperature range short suppresses the number of crystal nucleuses generated and enhances independent growth of each crystal nucleus, thus leading to a larger crystallite diameter in the obtained lithium titanate powder. On the other hand, calcination is preferably performed in short time at a low temperature in order to obtain a lithium titanate powder with a small BET diameter. However, under such calcination conditions, Ti source and Li source do not react sufficiently and lead to form different phases such as rutile-type titanium dioxide. In the present invention, it is speculated that BET diameter of the obtained lithium titanate powder can be made small while suppressing generation of different phases by reacting a Ti source and Li source sufficiently by: making a mixture for calcination to a condition such that Ti sources and Li sources at most places in the mixture can react easily in advance even in a short-time calcination, that is, fewer large particles which may take time to react sufficiently to the inside, and uniform mixture even locally; more specifically, preparing a mixed powder such that D95 becomes 5 μm or less; and subjecting a mixture composed of the mixed powder or a granulated powder obtained by granulating the mixed powder to a short-time calcination at a high temperature of 800° C. or more.

The lithium titanate powder of the present invention is obtained by calcining a mixed powder with D95 of 5 μm or less composed of a Ti source and Li source, or a mixture containing a granulated powder obtained by granulating the mixed powder, at a temperature of 800 to 1100° C. in a short-time, and also making length of time stayed within the temperature range of 700 to 800° C. short in a heat-up process during calcination. The lithium titanate powder of the present invention is obtained by using a mixed powder with D95 of 5 μm or less, or a granulated powder obtained by granulating the mixed powder when calcining a mixture composed of a Ti source and Li source at a temperature of 800 to 1100° C. and preferably, making length of time for maintaining 800° C. or more during calcination in a range of 2 to 90 minutes and length of time stayed within the temperature range of 700 to 800° C. in a heat-up process during calcination in a range of 15 minutes or less. Even in the case where the M source is added to the raw material, the lithium titanate powder of the present invention can be obtained by the manufacturing method under the same conditions as above, except that a mixed powder includes the M source in addition to the Ti source and Li source.

[Method of Manufacturing a Lithium Titanate Powder Containing M More in the Surface Region than the Inner Region of a Lithium Titanate Particle]

When the lithium titanate powder of the present invention is a lithium titanate powder containing M and the lithium titanate powder contains more M in the surface region than the inner region of a lithium titanate particle constituting the lithium titanate powder, the lithium titanate powder of the present invention can be manufactured such as by the following two methods.

In the first method, a coating layer including the M source or compound containing M is formed on a particle surface of a Ti source used as a raw material before mixing with a Li source and calcining. In the other method, the lithium titanate powder (hereafter, may be indicated as a lithium titanate powder of the base material) obtained by the method explained in [Method of manufacturing lithium titanate powder] above is mixed with a compound containing M and then subjected to heat treatment. These methods are described in detail below.

(Method of Forming a Coating Layer Including a Compound Containing M on a Ti Source Particle Surface Before Mixing with a Li Source and Calcination)

In order to make concentration of M higher in the surface region than the inner region among the existing range for M, and when a method of mixing compound containing M at the same time is used in a preparation process of a mixture composed of Ti source and Li source raw materials, particle surface of Ti source raw material is coated with compound containing M in advance.

As for a method for coating particle surface of the Ti source as raw material with compound containing M, coprecipitation of compound containing M in slurry wherein Ti source as raw material is dispersed can be used. For example, when the compound containing M is an aluminum compound, the coating layer is preferably at least one type selected from aluminum oxide and aluminum hydroxide.

An aluminum-containing inorganic compound coated with coating layer containing aluminum hydroxide can be produced appropriately by adjusting pH while stirring slurry prepared by dispersing or dissolving titanium oxide and sodium aluminate to water. The pH during adjustment is preferably 7 to 9, more preferably 7 to 8.5, further preferably 7 to 8, and further more preferably 7.3 to 7.8. The pH is adjusted preferably with inorganic acid, more preferably with sulfuric acid, and further preferably by dropping dilute sulfuric acid aqueous solution while stirring the slurry.

An aluminum-containing inorganic compound coated with coating layer containing aluminum oxide can be preferably produced by heating the aluminum-containing inorganic compound coated with coating layer containing aluminum hydroxide obtained as above. By heating, aluminum hydroxide has endothermic dehydrating-decomposing reaction and changes into aluminum oxide. The heating temperature is preferably 200 to 500° C., more preferably 200 to 400° C., and further preferably 200 to 300° C.

As for the aluminum-containing inorganic compound coated with coating layer containing aluminum oxide, the above titanium oxide with its particle surface coated with a coating layer containing aluminum oxide, such as by neutralizing sedimentation of metal salt, can be used. Also, commercially available titanium oxide coated with aluminum oxide, such as anatase-type titanium oxide of JIS type 2 and rutile-type titanium oxide of JIS types 1 to 4, can be used.

(Method of Mixing Lithium Titanate Powder and M Source Followed by Heat Treatment)

The lithium titanate powder of the present invention is a lithium titanate powder containing M and contains M more in the surface region than the inner region of a particle, is obtained by the manufacturing method including a mixing process where the lithium titanate powder as base material, which is obtained by the method explained in [Method of manufacturing lithium titanate powder], is mixed with a compound containing M, and a heat treatment process where the obtained mixed powder is subjected to heat treatment.

<Mixing Process>

As for compound containing M, any compound can be used as long as it is diffused by heat treatment. For example, oxide of M, hydroxide of M, and metal salt compound containing M can be used. In order to uniformly diffuse M onto the particle surface of lithium titanate powder, a wet-type method described later is suitable. In the wet-type method, preferably, compound containing M soluble to solvent is dissolved to its solvent and mixed with the lithium titanate powder of the base material. When compound containing M is metal salt compound containing M, in the perspective of achieving high charge-discharge capacity, an anionic species that does not leave impurities derived from the anionic species after heat treatment is suitable, for example, organic acid compound containing M or nitric acid compound containing M are preferable. Also, from the viewpoint of lowering the pH, fluoride of M is preferable.

There are no particular restrictions to the mixing method of the lithium titanate powder as base material and compound containing M, and either wet mixing or dry mixing process can be used. However, in order to make the element concentration of M in the surface region of the lithium titanate powder higher than the element concentration of M in the inner region, it is preferable that compound containing M is dispersed uniformly onto the lithium titanate particle surface, and from this point, the wet mixing is preferable.

As for dry mixing, for example, a paint mixer, a Henschel mixer, an ultrasonic dispersing apparatus, a homo mixer, a mortar, a ball mill, a centrifugal ball mill, a planetary ball mill, a vibratory ball mill, an attritor type high-speed ball mill, a bead mill, or a roll mill, etc., can be used.

As for wet mixing, a compound containing M and lithium titanate powder are added to water or alcohol solvent and mixed in slurry state. As for alcohol solvent, such as methanol, ethanol, or isopropyl alcohol, having the boiling point of 100° C. or less is preferable in the point that the solvent can be easily removed. Moreover, in the perspective of ease of recovery and disposal, water solvent is industrially preferable.

As for solvent amount, it may be the amount where the solvent can make both compound containing M and lithium titanate particles wet. However, since the compound containing M and lithium titanate particles are preferably dispersed uniformly in the solvent, it is preferable that the solvent amount is set to be the amount where 50% or more of the compound containing M can be dissolved with respect to the total amount of compound containing M which is charged. The amount of the compound containing M dissolved into the solvent increases as temperature becomes higher, thus compound containing M and lithium titanate powder is preferably mixed under heating. By heating, the solvent amount can be reduced and thus mixing under heating is an industrially suitable method. The mixing temperature is preferably 40 to 100° C., more preferably 60 to 100° C.

In case of wet mixing, depending on heating method, it is preferable that solvent is removed before heat treatment after mixing process. The solvent is preferably removed and dried by evaporation. As for evaporation and drying methods of solvent, a method of evaporating solvent by heating while stirring with stirring blades, a method of using drying apparatus that enables drying while stirring such as a conical dryer, and a method of using a spray dryer can be used. If a rotary kiln is used for heat treatment, the slurry mixture can be charged into the kiln as it is.

<Heat Treatment Process>

The heating method of heat treatment is not particularly limited. As a heat treatment furnace, such as a fixed-bed furnace, a roller-hearth kiln, a mesh-belt kiln, a fluidized-bed furnace, and a rotary kiln can be used. The atmosphere for heat treatment can be either air or inert gas such as nitrogen. If metal salt compound containing M is used for compound containing M, air atmosphere where anion species can be easily removed from the particle surface is preferable. The heat treatment temperature is preferably temperature where M disperses at least to the surface region of lithium titanate particle of the base material and where significant decrease in a specific surface area due to sintering of the lithium titanate of the base material does not occur. The upper limit value for the heat treatment temperature is 600° C., preferably 550° C., and more preferably 500° C. The lower limit value for the heat treatment temperature is 250° C. The length of heat treatment time is 0.5 to 8 hours, more preferably 2 to 5 hours. The temperature and length of time where M disperses at least to the surface region of lithium titanate particle of the base material vary depending on the reactivity of the compound containing M. For this reason, the temperature and length of time should be set accordingly.

[Active Material]

The active material of the present invention contains the lithium titanate powder. It may contain one or more materials other than the lithium titanate powder. As for other materials, for example, carbon materials [pyrolytic carbons, cokes, graphite (such as artificial graphite and natural graphite), organic polymer compound burned materials, and carbon fibers], tin or tin compound, and silicon or silicon compound are used.

[Energy Storage Device]

The energy storage device of the present invention is a device for storing and releasing energy by utilizing intercalation and deintercalation of lithium ions to electrodes containing the active material, such as a hybrid capacitor and lithium battery, etc.

[Hybrid Capacitor]

The hybrid capacitor is a device where an active material such as activated carbon that generates capacity by physical adsorption similar to that of an electrode material in an electric double-layer capacitor, an active material such as graphite that generates capacity by physical adsorption and intercalation and deintercalation, and an active material such as a conductive polymer that generates capacity by redox are used for the positive electrode, and where the active material of the present invention is used for the negative electrode.

[Lithium Battery]

The lithium battery of the present invention includes both lithium primary battery and lithium secondary battery. Also, in this specification, the term lithium secondary battery is used on the basis of the concept to include so-called lithium-ion secondary batteries.

The lithium battery consists of a positive electrode, a negative electrode, non-aqueous electrolyte where electrolyte salt is dissolved into a non-aqueous solvent, and so on, and the active material can be used as an electrode material. The active material may be used as either positive electrode active material or negative electrode active material. The following describes a case where the active material is used as the negative electrode active material.

<Negative Electrode>

A negative electrode contains a mixture layer including a negative electrode active material (the active material of the present invention), a conductive agent, and a binder on a single or both sides of a negative electrode current collector.

There are no particular restrictions to the conductive agent for a negative electrode, as long as it is electron conductive material that does not generate chemical changes. For example, graphite such as natural graphite (e.g., scale-like graphite) and artificial graphite, and carbon blacks such as acetylene black, Ketjenblack, channel black, furnace black, lamp black, and thermal black are used. Further, graphite and carbon blacks may be mixed accordingly for use. An amount of conductive agent added to the negative electrode mixture is preferably 1 to 10% by weight, and particularly preferably 2 to 5% by weight.

A binder agent for a negative electrode is, for example, polytetrafluoroethylene (PTFE), polyvinylidene fluoride (PVDF), styrene butadiene copolymer (SBR), acrylonitrile butadiene copolymer (NBR), and carboxymethyl cellulose (CMC), etc.

As for the negative electrode current collector, for example, the one made from aluminum, stainless steel, nickel, copper, titanium, calcined carbon, and copper or stainless steel with its surface treated with carbon, nickel, titanium, or silver, etc., may be used. Further, the surface of these materials can be oxidized or subjected to surface treatment so as to make the surface of the negative electrode current collector rough. Moreover, the negative electrode current collector may be in the form of, for example, a sheet, net, foil, film, punched material, lath, porous material, foamed material, fiber group, nonwoven fabric molding, etc.

<Positive Electrode>

A positive electrode contains a mixture layer including a positive electrode active material, a conductive agent, and a binder on a single or both sides of a positive electrode current collector.

As the positive electrode active material, a material that can absorb and release lithium is used. For example, as an active material, lithium metal complex oxide of cobalt, manganese, or nickel, and olivine type lithium metal phosphate, etc., may be used. These active materials can be used singly or in combination of two or more types. Examples of such complex metal oxide are, $LiCoO_2$, $LiMn_2O_4$, $LiNiO_2$, $LiCo_{1-x}Ni_xO_2$ (0.01<x<1), $LiCo_{1/3}Ni_{1/3}Mn_{1/3}O_2$, and $LiNi_{1/2}Mn_{3/2}O_4$, etc. A part of these lithium metal complex oxides can be replaced with another element. For example, the part of cobalt, manganese, or nickel may be replaced with at least one type of element selected from Sn, Mg, Fe, Ti, Al, Zr, Cr, V, Ga, Zn, Cu, Bi, Mo, and La, etc., or the part of "O" may be replaced with "S" or "F". Also, these complex metal oxides may be coated with a compound containing these other element. An example of olivine type lithium metal phosphate is at least one type selected from the group consisting of $LiFePO_4$, $LiCoPO_4$, $LiNiPO_4$, $LiMnPO_4$, $LiFe_{1-x}M_xPO_4$, etc., (where M is at least one type selected from the group consisting of Co, Ni, Mn, Cu, Zn, and Cd, and x satisfies $0 \leq x \leq 0.5$).

The conductive agent and binder for the positive electrode are the same as those used for the negative electrode. The positive electrode current collector is, for example, aluminum, stainless steel, nickel, titanium, calcined carbon, and aluminum or stainless steel with its surface treated with carbon, nickel, titanium, or silver, or the like. The surface of these materials can be oxidized or subjected to surface treatment so as to make the surface of the positive electrode current collector rough. Moreover, the current collector may be in the form of, for example, a sheet, net, foil, film, punched material, lath, porous material, foamed material, fiber group, nonwoven fabric molding, etc.

<Non-Aqueous Electrolyte Solution>

The non-aqueous electrolyte solution is made by dissolving electrolyte salt to a non-aqueous solvent. There are no particular restrictions to the non-aqueous electrolyte solution and various types can be used.

As an electrolyte salt, the one that dissolves into non-aqueous solvent is used. For example, a lithium salt such as $LiPF_6$, $LiBF_4$, and $LiClO_4$, a lithium salt containing a chain fluoroalkyl group such as $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3$ (iso-$C_3F_7$)$_3$, and $LiPF_5$ (iso-$C_3F_7$), a lithium salt containing a cyclic fluorinated alkylene chain such as $(CF_2)_2(SO_2)_2NLi$ and $(CF_2)_3(SO_2)_2NLi$, a lithium salt that contains oxalate complex as an anion such as lithium bis[oxalate-O,O']borate and lithium difluoro[oxalate-O,O']borate, etc., may be used. Among these, particularly preferable electrolyte salts are $LiPF_6$, $LiBF_4$, $LiN(SO_2CF_3)_2$, and $LiN(SO_2C_2F_5)_2$. These electrolyte salts may be used singly or in combination of two or more.

The electrolyte salts are completely dissolved in use and concentration of electrolyte salts is generally 0.3 M or more with respect to the non-aqueous solvent, more preferably 0.5 M or more, and further preferably 0.7 M or more. Further, its upper limit is preferably 2.5 M or less, more preferably 2.0 M or less, further preferably 1.5 M or less.

Examples of the non-aqueous solvent include cyclic carbonate, chain carbonate, chain ester, ether, amide, phosphoric ester, sulfonate, lactone, nitrile, and S=O bond-containing compound, etc.

The non-aqueous solvent is generally used in a mixture in order to achieve appropriate physical properties. Examples of their combinations are, a combination of cyclic carbonate and chain carbonate, a combination of cyclic carbonate, chain carbonate, and lactone, a combination of cyclic carbonate, chain carbonate, and ether, a combination of cyclic carbonate, chain carbonate, and chain ester, a combination of cyclic carbonate, chain carbonate, and nitrile, a combination of cyclic carbonate, chain carbonate, and S=O bond-containing compound, etc.

<Lithium Battery Structure>

The structure of the lithium battery of the present invention is not particularly limited. For instance, a coin type battery including a positive electrode, negative electrode, and single- or multi-layered separator, and a cylindrical battery and square type battery comprising a positive electrode, negative electrode, and roll separator, are some examples.

As a separator, an insulative thin film having high ion permeability and with a prescribed mechanical strength is used. Polyethylene, polypropylene, a cellulose paper, a glass fiber paper, polyethylene terephthalate, a polyimide micro porous film are some examples, and a multi-layered film formed by a combination of two or more of these can be also used. Also, surfaces of these separators may be coated with resin such as PVDF, silicon resin, and rubber resin, or with metal oxide particles such as aluminum oxide, silicon dioxide, and magnesium oxide. The pore diameter of the separator should be within the range useful for a battery in general, for example, 0.01 to 10 μm. The thickness of the separator should be within the range of a battery in general, for example, 5 to 300 μm.

EXAMPLES

In the following, the present invention will be specifically described using examples and comparative examples. However, the present invention is not construed as being limited to the following examples, but intended to include various combinations that can be easily analogized from the scope of the invention. Particularly, solvent combinations are not limited to those in the Examples.

[Method of Measuring Physical Properties]

(1) XRD

As a measurement device, an X-ray diffraction device that utilizes CuKα ray (RINT-TTR-III of Rigaku Corporation) was used. The conditions for the X-ray diffraction measurement were: measurement angle range (2θ) of 10° to 90°, step interval of 0.02°, length of measurement time of 0.25 sec./step, radiation source of CuKα ray, tube bulb voltage of 50 kV, and current of 300 mA.

The main peak intensity of the lithium titanate (peak intensity within the diffraction angle range 2θ=18.1 to 18.5°), the main peak intensity of rutile-type titanium dioxide (peak intensity within the diffraction angle range 2θ=27.2 to 27.6°), the main peak intensity of the anatase-type titanium dioxide (peak intensity within the diffraction angle range 2θ=24.7 to 25.7°), and the main peak intensity of $Li_2TiO_3$ (peak intensity within the diffraction angle range 2θ=18.2 to 18.7°) were measured.

Then, a relative value of the main peak intensity when the main peak intensity of lithium titanate is defined to be 100 was calculated for rutile-type titanium dioxide, anatase-type titanium dioxide, and $Li_2TiO_3$.

(2) Crystallite Diameter ($D_X$)

The crystallite diameter ($D_X$) of the lithium titanate powder of the present invention was determined using the following Scherrer's formula, the formula (5) below, from the half-peak width of the peak of the (111) plane of lithium titanate obtained under the measurement conditions of measurement angle range (2θ) of 15.8° to 21.0°, step interval of 0.01°, length of measurement time of 1 sec./step, radiation source of CuKα ray, tube bulb voltage of 50 kV, and current of 300 mA, using the same X-ray diffraction measurement device as the XRD mentioned above. In calculation of the half-peak width, the ray width by the diffractometer optical system needed to be corrected, and a silicon powder was used for the correction.

$$D_X = K \cdot \lambda / (FW(S) \cdot \cos \theta_c)$$

$$FW(S)\hat{}D = FWHM\hat{}D - FW(I)\hat{}D$$

$$FW(I) = f0 + f1 \times (2\theta) + f2 \times (2\theta)^2$$

$$\theta_c = (t0 + t1 \times (2\theta) + t2 \times (2\theta)^2)/2 \qquad (5)$$

K: Scherrer constant (0.94)
λ: CuKα$_1$ ray wavelength (1.54059 Å)
FW (S): half-peak width (FWHM) unique to the sample
FW (I): half-peak width (FWHM) unique to the device
D: deconvolution parameter (1.3)
f0=5.108673E−02
f1=1.058424E−04
f2=6.871481E−06
$\theta_c$: correction value for the Bragg angle
t0=−3.000E−03
t1=5.119E−04
t2=−3.599E−06

(3) Particle Size Distribution

For the particle size distribution measurement of the mixed powder and lithium titanate powder of the present invention, a laser diffraction/scattering particle size analyzer (Microtrac MT3300EXII of Nikkiso Co., Ltd.) was used. For the preparation of a measurement sample, ethanol was used as a measurement solvent for the case of a mixed powder and ion exchange water was used for the case of a lithium titanate powder. When the measurement sample was a powder, approximately 50 mg of the sample was added to 50 ml of the measurement solvent and then 1 cc of 0.2% aqueous solution of sodium hexametaphosphate as a surfactant, was added. The obtained slurry for the measurement was treated with a ultrasonic homogenizer. When the measurement sample was a mixed slurry composed of a mixed powder, the same method as used for when the measurement sample was a powder was used except for that approximately 50 mg of the sample on a powder basis was added. The subsequent operations were performed in the same method regardless of the measurement sample types. The slurry for the measurement subjected to dispersion treatment was put into a measurement cell and then the slurry concentration was adjusted by adding the measurement solvent. When the slurry transmittance became within the appropriate range, particle size distribution was measured. From the obtained particle size distribution curve, a volume-based particle diameter (D50) of the lithium titanate powder and D95 of the mixed powder were calculated.

(4) BET Specific Surface Area ($m^2/g$)

A BET specific surface area was measured in a one-point method using liquid nitrogen, using the automatic BET specific surface area analyzer (Macsorb HM model-1208, of Mountech Co., Ltd.).

(5) BET Diameter ($D_{BET}$)

The BET diameter ($D_{BET}$) was determined using the following formula (6) assuming that all particles constituting the powder were the spheres having the same diameter.

$$D_{BET}=6/(\rho_s \times S) \quad (6)$$

Here, $D_{BET}$ is the BET diameter (μm), $\rho_s$ is the true density (g/cc) of lithium titanate, and S is the BET specific surface area (m²/g).

(6) pH

The pH was measured for the dispersion liquid where 10 g of the lithium titanate powder was dispersed to 90 g of water.

(7) $T_M/T_{Ti}$, Atomic Ratio of M to Ti for the Entire Lithium Titanate Powder (Inductively Coupled Plasma Emission Spectrometric Analysis Method)

A quantitative analysis was performed for the element concentrations of metal element M and Ti contained in the entire lithium titanate powder using the inductively coupled plasma emission spectrometer, (SPS5100, of SII Nano Technology, Inc.). As a measurement sample, a test liquid prepared by hermetically sealing the precisely-weighed sample after adding nitric acid and hydrofluoric acid thereto, irradiating microwave for thermal decomposition, and adding ultrapure water up to a constant volume was used.

From the result of element concentration measurement for M and Ti, $T_M/T_{Ti}$, an atomic ratio of M to Ti was calculated.

(8) $C_M/C_{Ti}$, Atomic Ratio of M to Ti on the Particle Surface of the Lithium Titanate Powder (X-Ray Photoelectron Spectroscopy (XPS))

$C_M/C_{Ti}$, an atomic ratio of M atoms to Ti atoms on the particle surface of the lithium titanate powder was measured using the X-ray photoelectron spectroscopy (PHI 5000 of ULVAC-PHT, Inc.). Only when the lithium titanate powder containing Mg as the M, Al-Kα 25 W was used as the X-ray source. Whereas, when the lithium titanate powder containing metal element other than Mg as the M, Mg-Kα 400 W was used as the X-ray source.

From the peak intensities based on the number of photoelectrons of all detected elements, a surface atomic concentration was calculated using a relative sensitivity factor provided by ULVAC-PHT, Inc., and a ratio $C_M/C_{Ti}$ of M atoms to Ti atoms was calculated.

(9) Element Concentration of M at Lithium Titanate Particle Cross Section (Scanning Transmission Electron Microscope (STEM))

For a lithium titanate particle that configures the lithium titanate powder containing the M, a cross-sectional analysis of the lithium titanate particle was performed using the scanning transmission electron microscope (STEM), and element concentration of M was measured by the energy dispersive X-ray spectroscopy (EDS). The measurement method was as follows.

The lithium titanate particle was bonded to a dummy substrate using epoxy resin, cut, bonded to a reinforcement ring, grinded, dimpled, subjected to Ar-ion milling, and finally conducted carbon vapor deposition to prepare a thin sample.

The element concentration of M at a specific position in the obtained lithium titanate particle thin sample was measured by the energy dispersive X-ray spectroscopy (EDS) as follows. While observing the cross section of the thin sample at an accelerating voltage of 120 kV using the field-emission transmission electron microscope (with Cs correction) of JEOL Ltd., element concentrations of M at the 5 nm inner position from the sample surface along a straight line drawn vertically to a tangent from the contact point on the thin sample surface, and 100 nm inner position from the surface were measured using the UTW Si (Li) semiconductor detector of JEOL Ltd., provided with the microscope. The beam diameter, that is an analyzing area, was set to a 0.2 diameter circle.

(10) Crystal Structure of a Lithium Titanate Particle (Selected-Area Diffraction (SAD))

For a lithium titanate particle that configures the lithium titanate powder containing the M, a cross-sectional observation was performed for the lithium titanate particle using a scanning transmission electron microscope (STEM), and crystal structure inside the particle was analyzed by the selected-area diffraction (SAD) pattern measurement. Their methods were as follows.

Preparation of a thin sample and a cross-sectional observation using a scanning transmission electron microscope (STEM) were performed in the same method as in "(9) Element concentration of M in lithium titanate particle cross section (scanning transmission electron microscope (STEM))", and a selected-area diffraction (SAD) pattern including the entire particle was measured for an arbitrary particle. For the measurement, the camera length was set to 100 cm and the selected area was set to 350 nm.

Example 1

Figure 2:
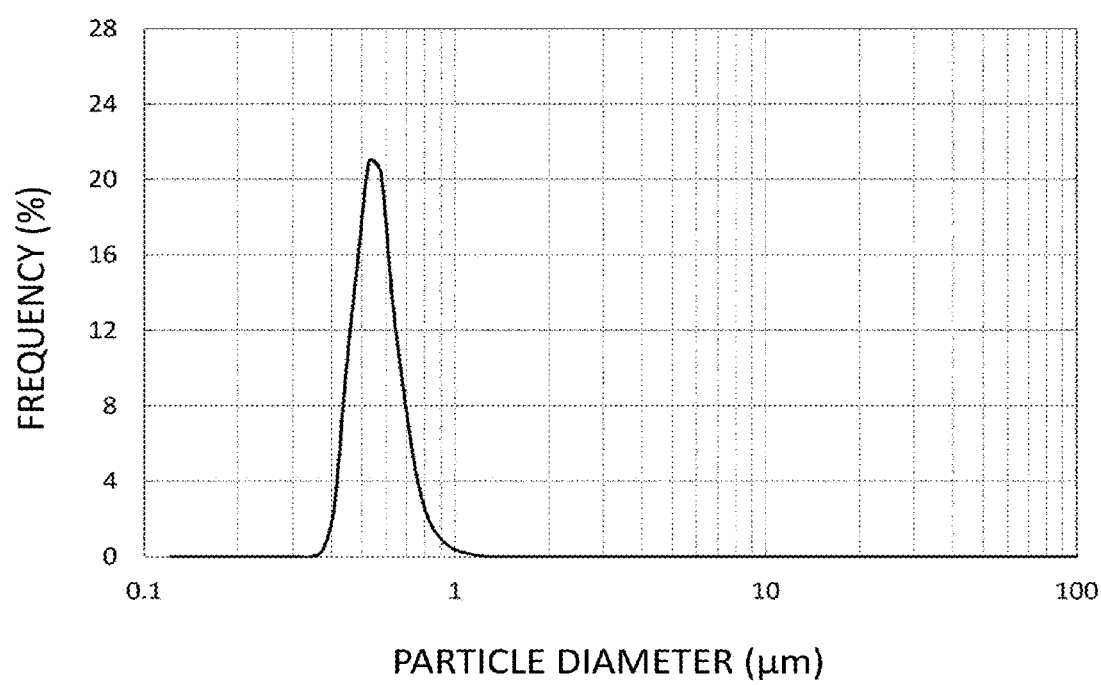
FIG. 2 is a particle size distribution curve of a mixed powder in the mixed slurry after milling in Example 1.

$Li_2CO_3$ (average particle diameter of 4.6 μm) and anatase-type $TiO_2$ (average particle diameter of 0.6 μm) were weighed so as to achieve the atomic ratio Li/Ti of Li to Ti of 0.84 and ion exchange water was added until the solid content concentration became 41% by weight and then stirred to create a mixed slurry. The slurry was milled and mixed using a bead mill (type; DYNO-MILL KD-20BC of Willy A. Bachofen AG, agitator material: polyurethane, vessel inner material: zirconia) where the beads were filled into the vessel by 80% by volume and controlling the agitator rotation speed to 13 m/s, slurry feed speed to 55 kg/hr, and vessel inner pressure to 0.02 to 0.03 MPa or less. The particle size distribution of the mixed powder in the mixed slurry before bead mill milling and mixing is shown in FIG. 1 and the particle size distribution of the mixed powder after bead mill milling and mixing is shown in FIG. 2. From the obtained particle size distribution in FIG. 2, D95 of the mixed powder after bead mill milling and mixing, that is a mixing powder to be subjected to calcination, was calculated. The calculation result is shown in Table 1. The D95 of the mixed powder in this example was 0.73 μm.

The obtained slurry was led into the furnace core tube of the rotary-kiln type calcination furnace (furnace core tube length: 4 m, furnace core tube diameter: 30 cm, external heating) with an adhesion prevention mechanism from the raw material supply side and then dried and calcined. At this time, slope angle for the furnace core tube of 2 degrees from the horizontal direction, the furnace core tube rotation speed of 20 rpm, and nitrogen is injected into the furnace core tube at flow speed of 20 lit./min. from the calcined material recovery side. Temperature of the furnace core tube was 900° C. for the raw material supply side, 900° C. for the central section, and 900° C. for the calcined material recovery side. The material was stayed at heating region for 26 minutes. Then, the calcined material recovered from the calcined material recovery side of the furnace core tube was deagglomerated using a hammer mill (AIIW-5 of Dalton Co., Ltd.) under conditions where screen mesh size was 0.5 mm, number of rotation times was 8,000 rpm, and powder feed speed was 25 kg/hr. The deagglomerated powder was sieved (mesh size of 45 μm) and the powder that passed through the sieve was collected.

For the obtained lithium titanate powder, XRD, D50 (μm), BET specific surface area (m$^2$/g), and pH were measured. Then, peak intensity ratio of the impurities to lithium titanate measured by the XRD, BET diameter $D_{BET}$ (μm), crystallite diameter $D_X$ (nm), and ratio of $D_{BET}$ to $D_X$, $D_{BET}/D_X$ (μm/μm), were calculated. The results are shown in Table 1. From the XRD measurement result of the lithium titanate powder in this example, only the peak of the small amount of rutile-type titanium dioxide was confirmed other than peaks attributed to $Li_4Ti_5O_{12}$, which had an intensity of 1.7 when the peak intensity that corresponds to the main peak of $Li_4Ti_5O_{12}$ is defined to be 100, Further, the lithium titanate powder in this example had D50 of 0.75 μm, BET specific surface area of 6.36 m$^2$/g, $D_{BET}$ of 0.27 μm, $D_X$ of 257 nm, and $D_{BET}/D_X$ (μm/μm) of 1.06, thus the ratio of $D_{BET}$ to $D_X$ showed a small value. The pH was 11.3.

Figure 3:
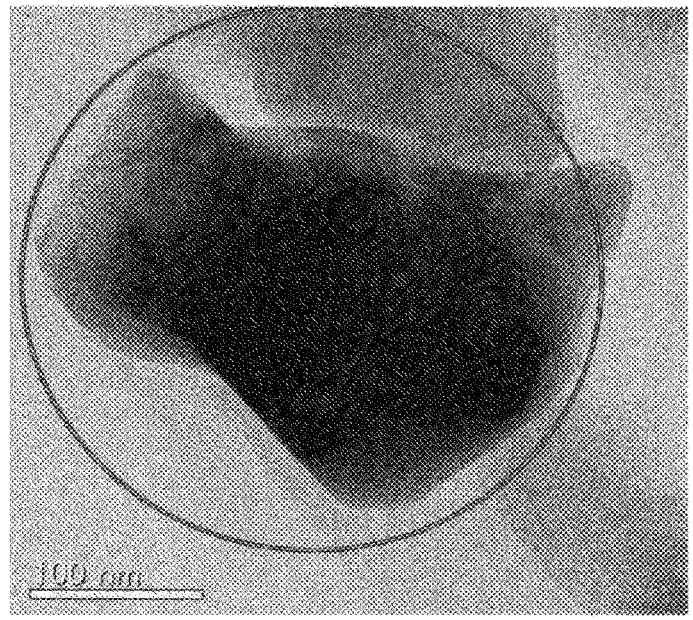
FIG. 3 is a cross section image of a lithium titanate particle by scanning transmission electron microscope (×400,000).
Figure 4:
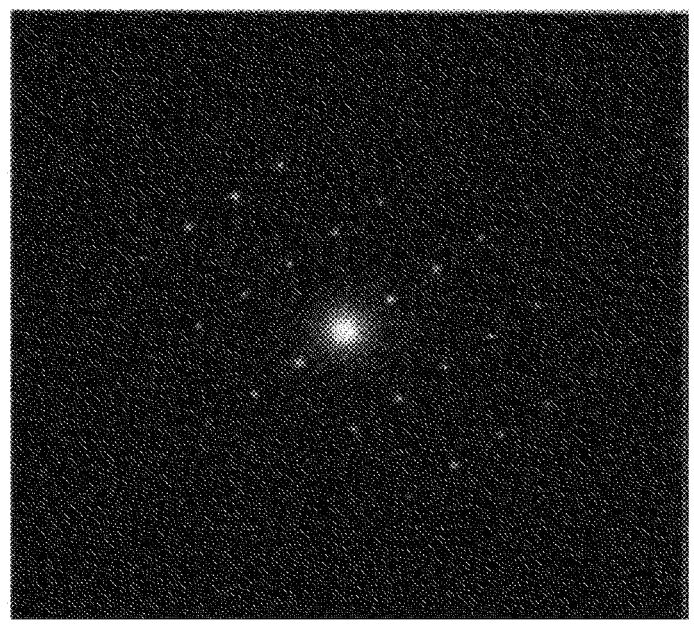
FIG. 4 is a selected-area diffraction pattern of a lithium titanate particle.

Furthermore, the crystal structure of the lithium titanate particle that configures the obtained lithium titanate powder was analyzed according to the method described in "(10) Crystal structure of a lithium titanate particle (selected-area diffraction (SAD))". A microscopic picture of a lithium titanate particle cross section magnified by 400,000 times with a scanning transmission electron microscope is shown in FIG. 3, and the selected-area diffraction pattern for the circled area (350 nm in diameter) of FIG. 3 is shown in FIG. 4. From the fact that a uniform diffraction pattern was found from the entire lithium titanate particle, the observed lithium titanate particle was determined to be a single crystal body.

<Preparation of Electrolyte Solution>

The electrolyte solution used in a battery for evaluation of room temperature (25° C.) characteristics was prepared as follows. A non-aqueous solvent was prepared so as to achieve a content ratio of ethylene carbonate (EC) to dimethyl carbonate (DMC) of 1:2. Then, $LiPF_6$ as an electrolyte salt was dissolved thereto so as to achieve its concentration of 1 M and the electrolyte solution was prepared.

In contrast, the electrolyte solution used in a battery for evaluation of low temperature (0° C.) characteristics was prepared as follows. A non-aqueous solvent was prepared so as to achieve a content ratio of ethylene carbonate (EC) to ethyl methyl carbonate (EMC) of 3:7. Then, $LiPF_6$, an electrolyte salt, was dissolved thereto so as to achieve its concentration of 1 M and the electrolyte solution was prepared.

<Fabrication of an Evaluation Electrode>

90% by mass of the lithium titanate powder in Example 1 as for an active material, 5% by mass of acetylene black (conductive agent), 5% by mass of polyvinylidene fluoride (binder) were mixed, and 1-methyl-2-pyrolidone solvent was added thereto and then casted onto aluminum foil and dried to obtain an electrode sheet. The electrode sheet was stamped out to a disk shape having a diameter of 14 mm, pressed under a pressure of 7 tons/cm$^2$, and dried under a vacuum for 5 hours at 120° C. to fabricate an evaluation electrode.

<Fabrication of Coin Batteries>

The evaluation electrode and lithium metal (formed into a disk having a thickness of 0.5 mm and a diameter of 16 mm) were disposed facing to each other thorough a glass filter (a double layer of GA-100 and GF/C of Whatman) interposed therebetween. Then, two types of non-aqueous electrolyte solution prepared for use in batteries for evaluation of room-temperature and low-temperature characteristics were added respectively and then sealed to fabricate two types of 2030-type coin batteries for evaluation of room-temperature and low-temperature characteristics.

Using these batteries, electrochemical characteristics (initial charge-discharge characteristics and input-output performance) of the evaluation electrode were evaluated for a room temperature and low temperature.

<Initial Charge-Discharge Characteristics (Room Temperature)>

When a reaction where Li is absorbed to the evaluation electrode is considered as charging, the coin-type battery for evaluation of room-temperature characteristics prepared by the method explained in <Fabrication of coin batteries> above was subjected to constant-voltage and constant-current charge (CCCV charge-1) where it was charged up to 1V with a current density of 0.2 mA/cm$^2$ in a constant temperature bath of 25° C. and charged at 1V until the charge current became a current density of 0.05 mA/cm$^2$ or less, followed by constant current discharge (CC discharge-1) up to 2V at a current density of 0.2 mA/cm$^2$. The above charge and discharge cycle was repeated for 3 times and the discharge capacity in the third cycle was used as the evaluation electrode capacity.

<Evaluation of Output Performance (Room Temperature)>

Following the discharge capacity measurement for the third cycle, an operation of "CCCV charge-1, CC discharge up to 2V at a current density of X mA/cm$^2$, and CC discharge-1" sequence was repeated in the order of X=1, X=2, X=4, and a discharge capacity in each current density (0.2 mA/cm$^2$, 1 mA/cm$^2$, 2 mA/cm$^2$, and 4 mA/cm$^2$) was measured as the output performance.

<Evaluation of Input Performance (Room Temperature)>

Following the discharge capacity measurement in each current density, an operation of "constant current charge up to iv at a current density of X mA/cm$^2$ and CC discharge-1" sequence was repeated in the order of X=0.2, X=1, X=2, X=4, and a charge capacity in each current density (0.2 mA/cm$^2$, 1 mA/cm$^2$, 2 mA/cm$^2$, and 4 mA/cm$^2$) was measured as the input performance.

<Input Performance (Low Temperature)>

The coin-type battery for evaluation of low-temperature characteristics prepared by the method explained in <Fabrication of coin batteries> above was measured for its initial charge-discharge characteristics in a constant temperature bath of 25° C. in the same method as explained in <Initial charge-discharge characteristics (room temperature)>. Then, in a constant temperature bath of 0° C., input performance at 0° C. was measured as the input performance at low temperature in the same method as explained in <Evaluation of input performance (room temperature)> above except for the temperature.

Figure 5:
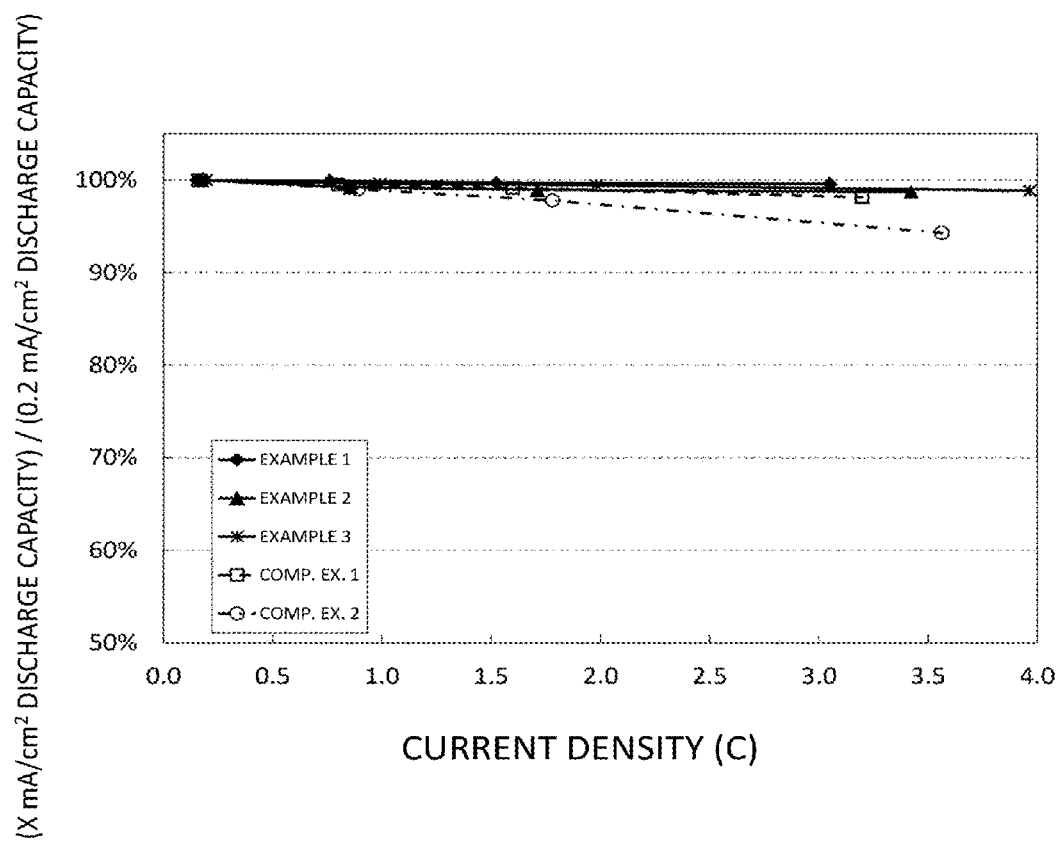
FIG. 5 is a graph illustrating output performance (at room temperature) of an evaluation electrode in each Example and Comparative Example.
Figure 6:
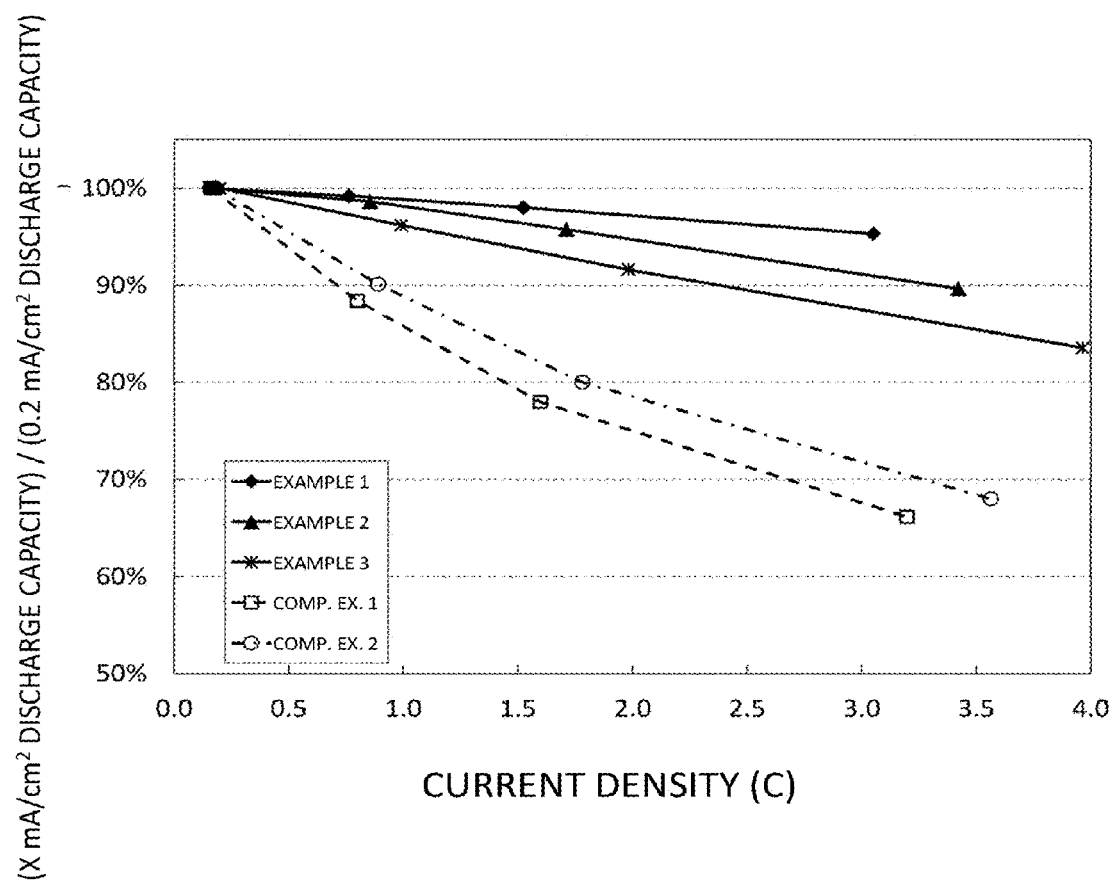
FIG. 6 is a graph illustrating input performance (at room temperature) of an evaluation electrode in each Example and Comparative Example.
Figure 7:
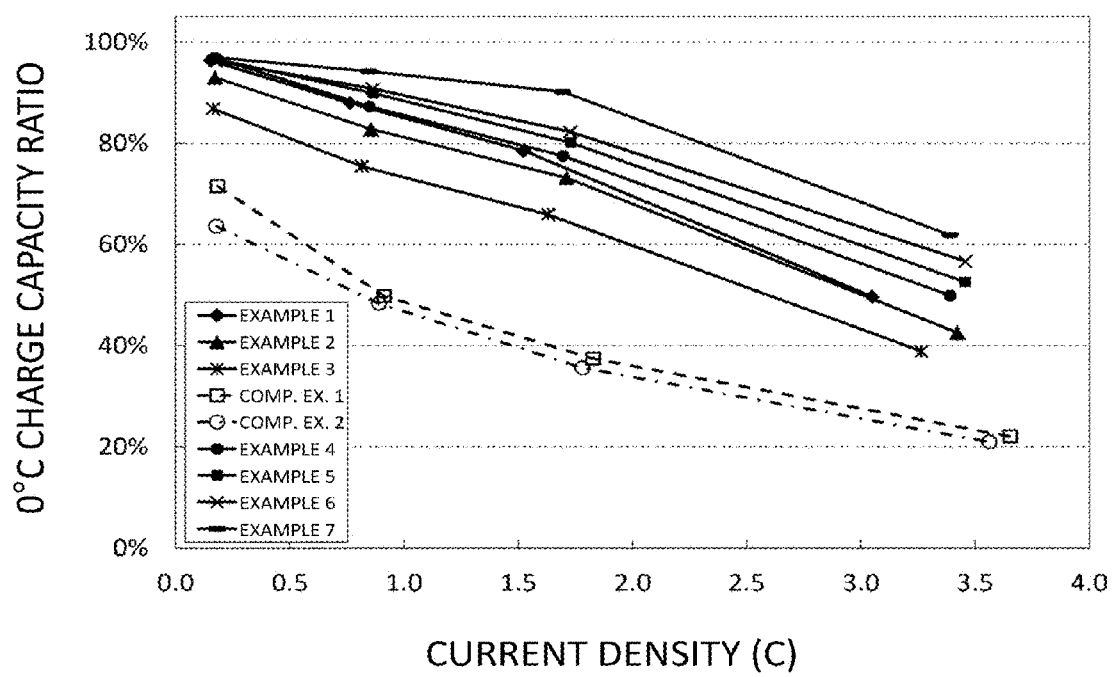
FIG. 7 is a graph illustrating input performance (at low temperature) of an evaluation electrode in each Example and Comparative Example.

The discharge capacity of the coin battery for evaluation at room temperature characteristics of this example, which was prepared as above, in the third cycle (evaluation electrode capacity) at 25° C. is shown in Table 1. Also, the result of the output performance evaluation for 25° C. is shown in FIG. 5, and the result of the input performance evaluation for 25° C. is shown in FIG. 6. Further, the result of the input performance evaluation for 0° C. of the coin battery for evaluation of low-temperature characteristics is shown in FIG. 7. In FIG. 6, results of Examples 2 and 3 and Comparative Examples 1 and 2 described in the following are also shown in addition to the result of Example 1, and in FIG. 7, the results of Examples 2 to 7 and Comparative Examples 1 and 2 are also shown in addition to the result of Example 1.

Figure 8:
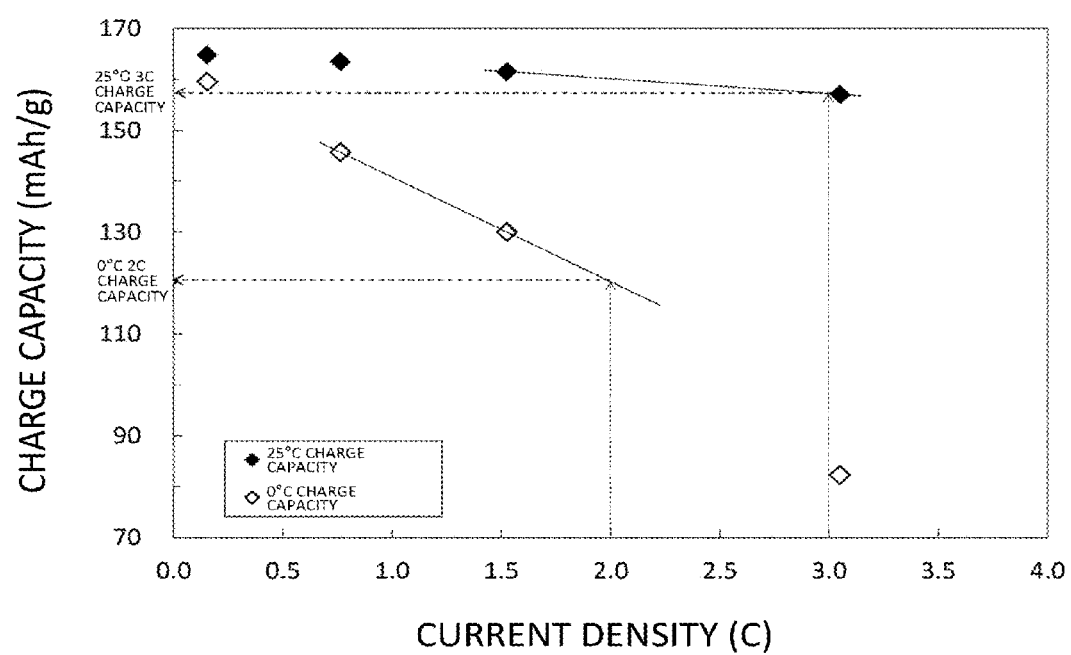
FIG. 8 is a graph illustrating input performance (at room temperature and low temperature) of an evaluation electrode in Example 1.

Current density was indicated by C rate where 1C was set current density to charge or discharge evaluation electrode capacity in 1 hour. Input-out performance at 25° C. was indicated as capacity ratio where the capacity at current density of 0.2 mA/cm² was defined to be 100%. Also, a charge capacity at 3C, 25° C. was calculated from input performance evaluation results at 25° C. as described below, and the capacity ratio to the evaluation electrode capacity i.e. discharge capacity at third cycle at 25° C. was indicated as the 3C charge capacity ratio at 25° C. in Table 1. The charge capacity at 3C 25° C. was calculated by interpolation of charge capacity and C rate at the current density of 2 mA/cm² and 4 mA/cm² with a straight line as shown in FIG. 8.

Also, from input performance evaluation results at 0° C., the charge capacity at 2C, 0° C. was calculated, and the capacity ratio of the charge capacity at 2C, 0° C. to the evaluation electrode capacity i.e. discharge capacity in the third cycle at 25° C. was indicated as the 2C charge capacity ratio at 0° C. in Table 1. The charge capacity at 2C, 0° C. was calculated by extrapolation of the charge capacity and C rate at current density of 1 mA/cm² and 2 mA/cm² were connected with a straight line as shown in FIG. 8.

The battery that used lithium titanate powder of this example had high initial charge-discharge capacity of 165.6 mAh/g at 25° C., and no significant decrease was seen in the discharge capacity ratio and only small decrease was seen in the charge capacity ratio even charged and discharged at high current density. The 3C charge capacity ratio at 25° C. indicated high value of 95%, and 2C charge capacity ratio at 0° C. was 72%.

Example 2

Mixed slurry composed of mixed powder having same D95 obtained in the same manner as used in Example 1 was granulated using a spray dryer and granulated powder was prepared. The granulated powder was put into a saggar made of high-purity alumina and calcined for 10 minutes at 900° C. in air atmosphere using a muffle furnace. The length of time stayed within 700 to 900° C. during heat-up was 14 minutes. Then, the calcined powder was recovered and sieved (mesh size of 45 μm) without deagglomeration, and the powder that passed through the sieve was collected. For the obtained lithium titanate powder, XRD, D50 (μm), BET specific surface area (m²/g), and pH were measured. Then, the peak intensity ratio of impurities to lithium titanate measured by the XRD, BET diameter $D_{BET}$ (μm), crystallite diameter $D_X$ (nm), and ratio $D_{BET}/D_X$ (μm/μm) of $D_{BET}$ to $D_X$ were calculated. The results are shown in Table 1. From the XRD measurement result of the lithium titanate powder in this example, other than peaks attributed to $Li_4Ti_5O_{12}$, only the peak of small amount of rutile-type titanium dioxide was confirmed, which had the main peak intensity of 2.5 when the peak intensity that corresponds to the main peak of $Li_4Ti_5O_{12}$ is defined to be 100. Further, the lithium titanate powder in this example had D50 of 18.60 μm, BET specific surface area of 3.96 m²/g, $D_{BET}$ of 0.44 μm, $D_X$ of 412 nm, and $D_{BET}/D_X$ (μm/μm) small value of 1.07. The pH was 11.3.

Also, using the obtained lithium titanate powder, an evaluation electrode and coin battery were fabricated in the same way as in Example 1, and electrochemical characteristics (initial charge-discharge characteristics, input-output performance, and low-temperature characteristics) of the evaluation electrode were evaluated in the same method as used in Example 1. The discharge capacity in the third cycle (evaluation electrode capacity), 3C charge capacity ratio, and 2C charge capacity ratio at 0° C. of the coin battery in this example are shown in Table 1. Also, output performance evaluation result for the battery is shown in FIG. 5 and input performance evaluation result is shown in FIG. 6. input performance evaluation result of the coin battery for low-temperature evaluation at 0° C. is shown in FIG. 7. The battery obtained by using lithium titanate powder of this example as an evaluation electrode had a high initial charge-discharge capacity of 166.7 mAh/g at 25° C., and no significant decrease was seen in the discharge capacity ratio and only small decrease was seen in the charge capacity ratio even when it was charged and discharged at high current density. 3C charge capacity ratio at 25° C. indicated high value of 90%, and 2C charge capacity ratio at 0° C. was 70%.

Example 3

$Li_2CO_3$ (average particle size of 2.1 μm) and anatase-type $TiO_2$ (average particle size of 0.6 μm) were weighed so as to achieve Li/Ti, atomic ratio of Li to Ti of 0.84 and mixed for 30 minutes with a Henschel mixer. D95 calculated from the obtained particle size distribution of the mixed powder is indicated in Table 1. The D95 of the mixed powder in this example was 3.69 μm. The obtained mixed powder was calcined in a rotary kiln in the same way as in Example 1. Then the calcined powder was recovered and sieved (mesh size of 45 μm) after deagglomeration in the same method as used in Example 1, and the powder that passed through the sieve was collected. For the obtained lithium titanate powder, XRD, D50 (μm), BET specific surface area (m²/g), and pH were measured. Then, peak intensity ratio of impurities to lithium titanate measured by the XRD, BET diameter $D_{BET}$ (μm), crystallite diameter $D_X$ (nm), and ratio $D_{BET}/D_X$ (μm/μm) of $D_{BET}$ to $D_X$ were calculated. The results are shown in Table 1. From the XRD measurement result of the lithium titanate powder in this example, other than peaks attributed to $Li_4Ti_5O_{12}$, only the peak of the small amount of rutile-type titanium dioxide was confirmed, which had the main peak intensity of 2.1 when the peak intensity that corresponds to the main peak of $Li_4Ti_5O_{12}$ is defined to be 100. Further, the lithium titanate powder in this example had D50 of 0.87 μm, BET specific surface area of 4.61 m²/g, $D_{BET}$ of 0.38 μm, $D_X$ of 212 nm, and $D_{BET}/D_X$ (μm/μm) small value of 1.78. The pH was 11.5.

Also, using the obtained lithium titanate powder, an evaluation electrode and coin battery were fabricated in the same way as in Example 1, and electrochemical characteristics (initial charge-discharge characteristics, input-output performance, and low-temperature characteristics) of the evaluation electrode were evaluated in the same method as used in Example 1. The discharge capacity in the third cycle (evaluation electrode capacity), 3C charge capacity ratio, and 2C charge capacity retention ratio at 0° C. of the coin battery in this example are shown in Table 1. Also, output performance evaluation result for the battery is shown in FIG. 5 and input performance evaluation result is shown in FIG. 6. The result of the coin battery for low-temperature evaluation at 0° C. is shown in FIG. 7. The battery obtained by using lithium titanate powder of this example as an evaluation electrode had a high initial charge-discharge capacity of 167.0 mAh/g at 25° C., and no significant decrease was seen in the discharge capacity ratio and only small decrease was seen in the charge capacity ratio even when it was charged and discharged at high current density.

The 3C charge capacity ratio at 25° C. indicated high value of 87%, and 2C charge capacity ratio at 0° C. was 62%.

Comparative Example 1

$Li_2CO_3$ (average particle size of 4.6 μm) and anatase-type $TiO_2$ (average particle size of 0.6 μm) were weighed so as to achieve Li/Ti, atomic ratio of Li to Ti of 0.84 and mixed for 30 minutes with a Henschel mixer. D95 calculated from the obtained particle size distribution of the mixed powder is indicated in Table 1. The D95 of the mixed powder in this comparative example was 6.00 μm. The obtained mixed powder was put into a saggar made of high-purity alumina and calcined for 2 hours at 900° C. in air atmosphere of using a muffle furnace. The length of time stayed within 700 to 900° C. during heat-up was 60 minutes. Then the calcined powder was recovered and sieved (mesh size of 45 μm) after deagglomeration in the same method as used in Example 1, and the powder that passed through the sieve was collected. For the obtained lithium titanate powder, XRD, D50 (μm), BET specific surface area (m²/g), and pH were measured. Then, peak intensity ratio of the impurities to lithium titanate measured by the XRD, BET diameter $D_{BET}$ (μm), crystallite diameter $D_X$ (nm), and ratio $D_{BET}/D_X$ (μm/μm) of $D_{BET}$ to $D_X$ were calculated. The results are shown in Table 1. From the XRD measurement result of the lithium titanate powder in this comparative example, no peaks were confirmed other than peaks attributed to $Li_4Ti_5O_{12}$. Further, the lithium titanate powder in this comparative example had D50 of 1.26 μm, BET specific surface area of 2.76 m²/g, $D_{BET}$ of 0.63 μm, $D_X$ of 193 nm, and $D_{BET}/D_X$ (μm/μm) large value of 3.26. The pH was 11.3.

Also, using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this comparative example are shown in Table 1. Also, output performance evaluation result for the battery is shown in FIG. 5 and input performance evaluation result is shown in FIG. 6. Input performance evaluation result of the coin battery for low-temperature evaluation is shown in FIG. 7. Although, the battery obtained by using lithium titanate powder of this comparative example as an evaluation electrode had a high initial charge-discharge capacity of 170.5 mAh/g at 25° C., and no significant decrease was seen in the discharge capacity ratio s at high discharged current density, significant decrease in the charge capacity ratio was seen at high charge current density. 3C charge capacity ratio at 25° C. indicated low value of 65%, and 2C charge capacity ratio at 0° C. also indicated low value of 34%.

Comparative Example 2

$LiOH.H_2O$ (average particle size of 12.1 μm) and anatase-type $TiO_2$ (average particle size of 0.6 μm) were weighed so as to achieve Li/Ti, atomic ratio of Li to Ti of 0.84 and mixed for 30 minutes with a Henschel mixer. D95 calculated from the obtained particle size distribution of the mixed powder is indicated in Table 1. The D95 of the mixed powder in this comparative example was 31.00 μm. The obtained mixed powder was put into a saggar made of high-purity alumina and calcined for 6 hours at 800° C. in air atmosphere using a muffle furnace. The length of time stayed within 700 to 900° C. during heat-up was 60 minutes. Then the calcined powder was recovered and sieved (mesh size of 45 μm) after deagglomeration in the same method as used in Example 1, and the powder that passed through the sieve was collected. For the obtained lithium titanate powder, XRD, D50 (μm), BET specific surface area (m²/g), and pH were measured. Then, a peak intensity ratio of the impurities to lithium titanate measured by the XRD, BET diameter $D_{BET}$ (μm), crystallite diameter $D_X$ (nm), and ratio $D_{BET}/D_X$ (μm/μm) of $D_{BET}$ to $D_X$ were calculated. The results are shown in Table 1. From the XRD measurement result of the lithium titanate powder in this comparative example, peaks of rutile-type titanium dioxide having a peak intensity of 6.0 and $Li_2TiO_3$ having a peak intensity of 2.0 were confirmed in addition to the peak of $Li_4Ti_5O_{12}$, when the peak intensity that corresponds to the main peak of $Li_4Ti_5O_{12}$ is defined to be 100. Further, the lithium titanate powder in this comparative example had D50 of 1.12 μm, BET specific surface area of 3.22 m²/g, $D_{BET}$ of 0.54 μm, $D_X$ of 76 nm, and $D_{BET}/D_X$ (μm/μm) large value of 7.11. The pH was 11.6.

Using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this comparative example are shown in Table 1. Also, output performance result for the battery is shown in FIG. 5 and input performance evaluation result is shown in FIG. 6. Input performance evaluation result of the coin battery for low-temperature evaluation is shown in FIG. 7. In the battery obtained by using lithium titanate powder of this comparative example as an evaluation electrode, although only small decrease in the discharge capacity ratio was seen at high current density at 25° C., initial charge-discharge capacity was as small as 157.2 mAh/g, and significant decrease in the charge capacity ratio was seen at high charge current density. 3C charge capacity retention ratio at 25° C. indicated low value of 72%, and 2C charge capacity retention ratio at 0° C. also indicated low value of 32%.

Example 4

When mixing the raw materials, $Al_2O_3$ (average particle size of 0.5 μm) was added as Al source to the Ti source and Li source prepared in the same ratio as in Example 1, so as to achieve Al/Ti, an atomic ratio of Al to Ti of 0.030. Except for that $Al_2O_3$ was added and mixed, the lithium titanate powder for Example 4 was prepared in the same way as in Example 3. For the obtained lithium titanate powder, XRD, D50 (μm), BET specific surface area (m²/g), and pH were measured. Then, a peak intensity ratio of the impurities to lithium titanate measured by the XRD, BET diameter $D_{BET}$ (μm), crystallite diameter $D_X$ (nm), and ratio $D_{BET}/D_X$ (μm/μm) of $D_{BET}$ to $D_X$ were calculated. The results are shown in Table 2. From the XRD measurement result of the lithium titanate powder in this example, no peaks of other crystal phases than $Li_4Ti_5O_{12}$ were confirmed. Further, the lithium titanate powder in this example had D50 of 0.96 μm, BET specific surface area of 4.15 m²/g, $D_{BET}$ of 0.419 μm, $D_X$ of 257 nm, and $D_{BET}/D_X$ (μm/μm) small value of 1.63. The pH was 11.2.

Also, for the obtained lithium titanate powder, element concentration of Al contained in the lithium titanate powder, and its atomic ratio with respect to Ti were measured in the methods described in "(7) Atomic ratio $T_M/T_{Ti}$ of M to Ti for the entire lithium titanate powder (inductively coupled plasma emission spectrometric analysis method)", "(8) $C_M/C_{Ti}$, atomic ratio of M to Ti on a particle surface of the lithium titanate powder (X-ray photoelectron spectroscopy (XPS))", and "(9) Element concentration of M in lithium titanate particle cross section (scanning transmission electron microscope (STEM))".

$T_{Al}/T_{Ti}$ atomic ratio of Al to Ti for the entire lithium titanate powder (hereafter called "A"), $C_{Al}/C_{Ti}$ atomic ratio of Al to Ti for the particle surface of the lithium titanate powder (hereafter called "B") measured by the X-ray photoelectron spectroscopy, ratio B/A of the B to the A and element concentration ratio (D1/D2) for Al in the surface region and inner region measured in the cross-sectional analysis for the lithium titanate powder in this example are shown in Table 2. For the lithium titanate powder in this example, $T_{Al}/T_{Ti}$ (A) was 0.030, $C_{Al}/C_{Ti}$ (B) was 0.032, B/A was 1.1 and D1/D2 was 2.0.

Using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this example are shown in Table 2. Also, input performance evaluation result of the coin battery for of low-temperature evaluation at 0° C. is shown in FIG. 7. The battery obtained by using lithium titanate powder of this example as an evaluation electrode had a high initial charge-discharge capacity of 165.3 mAh/g at 25° C., and no significant decrease was seen in the discharge capacity ratio and only small decrease was seen in the charge capacity ratio even when it was charged and discharged at high current density. 3C charge capacity ratio at 25° C. indicated high value of 89%, and the 2C charge capacity ratio at 0° C. also indicated high value of 75%.

Example 5

The lithium titanate powder for Example 5 was prepared in the same way as in Example 3, except that when mixing the raw materials, magnesium hydroxide (Mg(OH)$_2$, average particle diameter of 0.6 μm) was added as a Mg source to the Ti source and Li source prepared in the same ratio as in Example 3, so as to achieve Mg/Ti, atomic ratio of Mg to Ti of 0.014.

For the obtained lithium titanate powder, XRD, D50 (μm), BET specific surface area (m$^2$/g), and pH were measured. Then, a peak intensity ratio of the impurities to lithium titanate measured by the XRD, BET diameter $D_{BET}$ (μm), crystallite diameter $D_X$ (nm), and ratio $D_{BET}/D_X$ (μm/μm) of $D_{BET}$ to $D_X$ were calculated. The results are shown in Table 2. From the XRD measurement result of the lithium titanate powder in this example, other than peaks attributed to Li$_4$Ti$_5$O$_{12}$, only the peak of small amount of rutile-type titanium dioxide was confirmed, which had an intensity of 0.5 when the peak intensity that corresponds to the main peak of Li$_4$Ti$_5$O$_{12}$ is defined to be 100. Further, the lithium titanate powder in this example had D50 of 0.91 μm, BET specific surface area of 4.90 m$^2$/g, $D_{BET}$ of 0.355 μm, $D_X$ of 238 nm, and $D_{BET}/D_X$ (μm/μm) of small value 1.49. The pH was 10.9.

Also, for the obtained lithium titanate powder, element concentration of Mg contained in the lithium titanate powder and its atomic ratio with respect to Ti were measured in the same method as used in Example 4. The measurement result is shown in Table 2 as in Example 4. For the lithium titanate powder in this example, $T_{Mg}/T$ (A) was 0.014, $C_{Mg}/C_{Ti}$ (B) was 0.018, B/A was 1.3 and D1/D2 was 1.3.

Using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this example are shown in Table 2. Also, input performance evaluation result of the coin battery for low-temperature evaluation at 0° C. is shown in FIG. 7. The battery obtained by using lithium titanate powder of this example as an evaluation electrode had a high initial charge-discharge capacity of 165.5 mAh/g at 25° C., and no significant decrease was seen in the discharge capacity ratio and only small decrease was seen in the charge capacity ratio even when it was charged and discharged at high current density. 3C charge capacity ratio at 25° C. indicated high value of 89%, and 2C charge capacity ratio at 0° C. also indicated high value of 77%.

Example 6

The Ti source of raw material was prepared as follows. Sodium aluminate and anatase-type TiO$_2$ (average particle size of 0.6 μm) were weighed so as to achieve Al/Ti, atomic ratio of Al to Ti of 0.30 and dispersed and dissolved into water for preparation of a slurry. Then, 0.05 mol/liter of sulfuric acid aqueous solution was added dropwise to the slurry with stirring and the pH was adjusted to 7.5. The slurry was then filtered and dried to prepare lithium titanate powder composed of titanium oxide particles coated with aluminum hydroxide.

The lithium titanate powder for Example 6 was prepared in the same way as in Example 3, except for that obtained titanate oxide powder composed of titanium oxide particles coated with aluminum hydroxide was used as the Ti source.

For the obtained lithium titanate powder, XRD, D50 (μm), BET specific surface area (m$^2$/g), and pH were measured. Then, a peak intensity ratio of the impurities to lithium titanate measured by the XRD, BET diameter $D_{BET}$ (μm), crystallite diameter $D_X$ (nm), and ratio $D_{BET}/D_X$ (μm/μm) of $D_{BET}$ to $D_X$ were calculated. The results are shown in Table 2. From the XRD measurement result of the lithium titanate powder in this example other than the peaks attributed to Li$_4$Ti$_5$O$_{12}$, no peaks of other crystal phases were confirmed. Further, the lithium titanate powder in this example had D50 of 0.92 μm, BET specific surface area of 4.45 m$^2$/g, $D_{BET}$ of 0.391 μm, $D_X$ of 251 nm, and $D_{BET}/D_X$ (μm/μm) small value of 1.56. The pH was 11.3.

Also, for the obtained lithium titanate powder, element concentration of Al contained in the lithium titanate powder, and its atomic ratio with respect to Ti were measured in the same method as used in Example 4. The measurement result is shown in Table 2 as in Example 4. For the lithium titanate powder in this example, $T_{Al}/T_{Ti}$ (A) was 0.030, $C_{Al}/C_{Ti}$ (B) was 0.160, B/A was 5.3 and D1/D2 was 3.3.

Using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this example are shown in Table 2. Also, input performance evaluation result of the coin battery for low-temperature characteristics evaluation at 0° C. is shown in FIG. 7. The battery obtained by using lithium titanate powder of this example as an evaluation electrode had a high initial charge-discharge capacity of 165.1 mAh/g at 25° C., and no significant decrease in the discharge capacity ratio and only small decrease was seen in the charge capacity ratio. 3C charge capacity ratio at 25° C. indicated high value of 90%, and 2C charge capacity ratio at 0° C. also indicated high value of 80%.

Example 7

Using soluble aluminum acetate (contained 7% of Al) as the M source (Al source), the soluble aluminum acetate and the lithium titanate powder obtained in Example 1 were weighed so as to achieve Al/Ti, an atomic ratio of Al to Ti of 0.011 when mixed. Then, these were added and mixed to water of the three times of the lithium titanate powder. At this time, the soluble aluminum acetate was dissolved 100%. The obtained slurry was heated to 90° C. while mixing to evaporate water and dried. The obtained mixed powder was subjected to heat treatment for 5 hours in an atmosphere of 500° C. and the lithium titanate powder for Example 7 was obtained.

For the obtained lithium titanate powder, XRD, D50 (µm), BET specific surface area (m²/g), and pH were measured. Then, a peak intensity ratio of the impurities to lithium titanate measured by the XRD, BET diameter $D_{BET}$ (µm), crystallite diameter $D_X$ (nm), and ratio $D_{BET}/D_X$ (µm/µm) of $D_{BET}$ to $D_X$ were calculated. The results are shown in Table 3. From the XRD measurement result of the lithium titanate powder in this example, only the peak of the small amount of rutile-type titanium dioxide was confirmed other than the peaks attributed to $Li_4Ti_5O_{12}$, which had an intensity of 1.7 when the peak intensity that corresponds to the main peak of $Li_4Ti_5O_{12}$ is defined to be 100. Further, the lithium titanate powder in this example had D50 of 0.78 µm, BET specific surface area of 5.75 m²/g, $D_{BET}$ of 0.302 µm, $D_X$ of 273 nm, and $D_{BET}/D_X$ (µm/µm) small value of 1.11. The pH was 11.2.

Figure 9:
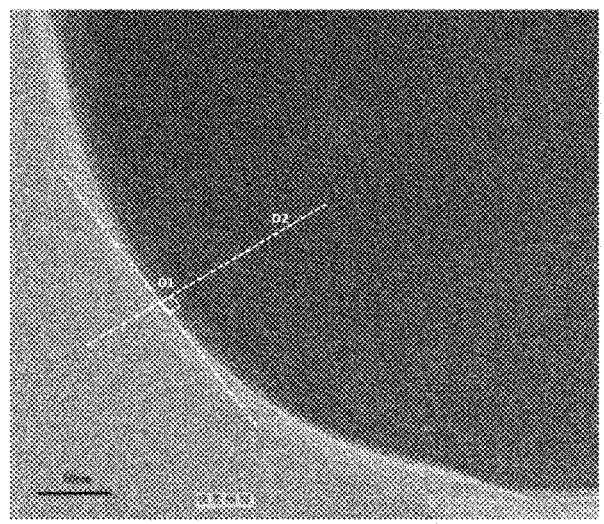
FIG. 9 is a scanning transmission electron microscopic image of a lithium titanate particle obtained in Example 7 (×500,000).

Also, for the obtained lithium titanate powder, element concentration of Al contained in the lithium titanate powder, and its atomic ratio with respect to Ti were measured in the same method as used in Example 4. The measurement result is shown in Table 3 as in Example 4. Also, in FIG. 9, a microscopic picture magnified by 500,000 times with the scanning transmission electron microscope is shown. For the lithium titanate powder in this example, $T_{Al}/T_{Ti}$ (A) was 0.011, $C_{Al}/C_{Ti}$ (B) was 0.100, B/A was 9.1, D1 was 2.7, and D2 was not detected.

An evaluation electrode and coin battery were fabricated in the same way as in Example 1 using the obtained lithium titanate powder, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this example are shown in Table 3. Also, input performance evaluation result of the coin battery for low-temperature characteristics evaluation at 0° C. is shown in FIG. 7. The battery obtained by using lithium titanate powder of this example as an evaluation electrode had a high initial charge-discharge capacity of 165.5 mAh/g at 25° C., no significant change was seen in the discharge capacity ratio and only small decrease was seen in the charge capacity ratio, even when it was charged and discharged at high current density. 3C charge capacity ratio at 25° C. indicated high value of 96%, and 2C charge capacity ratio at 0° C. indicated particularly high value of 89%.

Example 8

The lithium titanate powder for Example 8 was prepared in the same way as in Example 7, except for that soluble aluminum acetate (contained 7% of Al) and the lithium titanate powder obtained in Example 1 were weighed so as to achieve Al/Ti, an atomic ratio of Al to Ti of 0.023 when mixed.

For the obtained lithium titanate powder, XRD, D50 (µm), BET specific surface area (m²/g), and pH were measured. Then, a peak intensity ratio of the impurities to lithium titanate measured by the XRD, BET diameter $D_{BET}$ (µm), crystallite diameter $D_X$ (nm), and ratio $D_{BET}/D_X$ (µm/µm) of $D_{BET}$ to $D_X$ were calculated. The results are shown in Table 3. From the XRD measurement result of the lithium titanate powder in this example, only the peak of the small amount of rutile-type titanium dioxide was confirmed other than the peaks attributed to $Li_4Ti_5O_{12}$, which had an intensity of 1.7 when the peak intensity that corresponds to the main peak of $Li_4Ti_5O_{12}$ is defined to be 100. Further, the lithium titanate powder in this example had D50 of 0.80 µm, BET specific surface area of 5.61 m²/g, $D_{BET}$ of 0.310 µm, $D_X$ of 252 nm, and $D_{BET}/D_X$ (µm/µm) of small value 1.23. The pH was 11.3.

Also, for the obtained lithium titanate powder, element concentration of Al contained in the lithium titanate powder, and its atomic ratio with respect to Ti were measured in the same method as used in Example 4. The measurement result is shown in Table 3 as in Example 4. For the lithium titanate powder in this example, $T_{Al}/T_{Ti}$ (A) was 0.023, $C_{Al}/C_{Ti}$ (B) was 0.190, B/A was 8.3, D1 was 3.2, and D2 was not detected.

Using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this example are shown in Table 3. The battery obtained by using lithium titanate powder of this example as an evaluation electrode had a high initial charge-discharge capacity of 165.0 mAh/g at 25° C. no significant decrease was seen in the discharge capacity ratio and only small decrease was seen in the charge capacity ratio, even when it was charged and discharged at high current density. 3C charge capacity ratio at 25° C. indicated high value of 96%, and 2C charge capacity ratio at 0° C. indicated particularly high value of 90%.

Example 9

The lithium titanate powder for Example 9 was prepared in the same way as in Example 7, except for that M source (Al source) was changed to aluminum lactate.

For the obtained lithium titanate powder, XRD, D50 (μm), BET specific surface area (m$^2$/g), and pH were measured. Then, a peak intensity ratio of the impurities to lithium titanate measured by the XRD, BET diameter $D_{BET}$ (μm), crystallite diameter $D_X$ (nm), and ratio $D_{BET}/D_X$ (μm/μm) of $D_{BET}$ to $D_X$ were calculated. The results are shown in Table 3. From the XRD measurement result of the lithium titanate powder in this example, only the peak of the small amount of rutile-type titanium dioxide was confirmed other than peaks attribute to $Li_4Ti_5O_{12}$, which had an intensity of 1.7 when the peak intensity that corresponds to the main peak of $Li_4Ti_5O_{12}$ is defined to be 100. Further, the lithium titanate powder in this example had D50 of 0.77 μm, BET specific surface area of 5.88 m$^2$/g, $D_{BET}$ of 0.296 μm, $D_X$ of 263 nm, and $D_{BET}/D_X$ (μm/μm) small value of 1.12. The pH was 11.3.

Also, for the obtained lithium titanate powder, element concentration of Al contained in the lithium titanate powder, and its atomic ratio with respect to Ti were measured in the same method as used in Example 4. The measurement result is shown in Table 3 as in Example 4. For the lithium titanate powder in this example, $T_{Al}/T_{Ti}$ (A) was 0.011, $C_{Al}/C_{Ti}$ (B) was 0.180, B/A was 16.4, D1 was 2.4, and D2 was not detected.

Using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this example are shown in Table 3. The battery obtained by using lithium titanate powder of this example as an evaluation electrode had a high initial charge-discharge capacity of 165.6 mAh/g at 25° C. and no significant decrease was seen in the discharge capacity ratio and only small decrease was seen in the charge capacity ratio even when it was charged and discharged at high current density. 3C charge capacity ratio at 25° C. indicated high value of 96%, and 2C charge capacity ratio at 0° C. indicated particularly high value of 90%.

Example 10

The lithium titanate powder for Example 10 was prepared in the same way as in Example 7, except for that M source (Al source) was changed to aluminum sulfate 16-hydrate.

For the obtained lithium titanate powder, XRD, D50 (μm), BET specific surface area (m$^2$/g), and pH were measured. Then, a peak intensity ratio of the impurities to lithium titanate measured by the XRD, BET diameter $D_{BET}$ (μm), crystallite diameter $D_X$ (nm), and ratio $D_{BET}/D_X$ (μm/μm) of $D_{BET}$ to $D_X$ were calculated. The results are shown in Table 3. From the XRD measurement result of the lithium titanate powder in this example, only the peak of the small amount of rutile-type titanium dioxide was confirmed other than the peaks attributed to $Li_4Ti_5O_{12}$, which had an intensity of 1.7 when the peak intensity that corresponds to the main peak of $Li_4Ti_5O_{12}$ is defined to be 100. Further, the lithium titanate powder in this example had D50 of 0.77 μm, BET specific surface area of 5.63 m$^2$/g, $D_{BET}$ of 0.309 μm, $D_X$ of 278 nm, and $D_{BET}/D_X$ (μm/μm) small value of 1.11. The pH was 11.1.

Also, for the obtained lithium titanate powder, element concentration of Al contained in the lithium titanate powder, and its atomic ratio with respect to Ti were measured in the same method as used in Example 4. The measurement result is shown in Table 3 as in Example 4. For the lithium titanate powder in this example, $T_{Al}/T_{Ti}$ (A) was 0.011, $C_{Al}/C_{Ti}$ (B) was 0.120, B/A was 10.9, D1 was 2.2, and D2 was not detected.

Using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 0° C. 2C charge capacity ratio of the coin battery in this example are shown in Table 3. The battery obtained by using lithium titanate powder of this example as an evaluation electrode had a high initial charge-discharge capacity of 165.3 mAh/g at 25° C. and no significant decrease was seen in the discharge capacity ratio and only small decrease was seen in the charge capacity ratio even when it was charged and discharged at high current density. 3C charge capacity ratio at 25° C. indicated high value of 97%, and 2C charge capacity ratio at 0° C. indicated particularly high value of 92%.

Example 11

The lithium titanate powder for Example 11 was prepared in the same way as in Example 7, except for that M source (Al source) was changed to aluminum fluoride, heat treatment temperature was changed to 400° C., and atmosphere for heat treatment was changed to nitrogen.

For the obtained lithium titanate powder, XRD, D50 (μm), BET specific surface area (m$^2$/g), and pH were measured. Then, a peak intensity ratio of the impurities to lithium titanate measured by the XRD, BET diameter $D_{BET}$ (μm), crystallite diameter $D_X$ (nm), and ratio $D_{BET}/D_X$ (μm/μm) of $D_{BET}$ to $D_X$ were calculated. The results are shown in Table 3. From the XRD measurement result of the lithium titanate powder in this example, only the peak of the small amount of rutile-type titanium dioxide was confirmed other than peaks attributed to $Li_4Ti_5O_{12}$, which had an intensity of 1.7 when the peak intensity that corresponds to the main peak of $Li_4Ti_5O_{12}$ is defined to be 100. Further, the lithium titanate powder in this example had D50 of 0.76 μm, BET specific surface area of 6.27 m$^2$/g, $D_{BET}$ of 0.277 $D_X$ of 244 nm, and $D_{BET}/D_X$ (μm/μm) small value of 1.14. The pH was 9.5

Also, for the obtained lithium titanate powder, element concentration of Al contained in the lithium titanate powder, and its atomic ratio with respect to Ti were measured in the same method as used in Example 4. The measurement result is shown in Table 3 as in Example 4. For the lithium titanate powder in this example, $T_{Al}/T_{Ti}$ (A) was 0.011, $C_{Al}/C_{Ti}$ (B) was 0.215, B/A was 19.6, D1 was 1.2, and D2 was not detected. Also, the surface concentration of fluorine element determined by X-ray photoelectron spectroscopy was 4.3 atm %.

Using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this example are shown in Table 3. The battery obtained by using lithium titanate powder of this example as an evaluation electrode had a high initial charge-discharge capacity of 166.8 mAh/g at 25° C. and no significant decrease was seen in the discharge capacity ratio and only small decrease was seen in the charge capacity ratio even when it was charged and discharged at high current density. 3C charge capacity ratio at 25° C. indicated high value of 96%, and 2C charge capacity ratio at 0° C. indicated particularly high value of 90%.

Example 12

The lithium titanate powder for Example 12 was prepared in the same way as in Example 7, except for that M source (Mg source) was changed to magnesium sulfate heptahydrate, the magnesium sulfate heptahydrate and lithium titanate powder obtained in Example 1 were weighed so as to achieve Mg/Ti, an atomic ratio of Mg to Ti of 0.011 when mixed, and heat treatment temperature was changed to 250° C.

For the obtained lithium titanate powder, XRD, D50 (μm), BET specific surface area (m$^2$/g), and pH were measured. Then, a peak intensity ratio of the impurities to lithium titanate measured by the XRD, BET diameter $D_{BET}$ (μm), crystallite diameter $D_X$ (nm), and ratio $D_{BET}/D_X$ (μm/μm) of $D_{BET}$ to $D_X$ were calculated. The results are shown in Table 3. From the XRD measurement result of the lithium titanate powder in this example, only the peak of the small amount of rutile-type titanium dioxide was confirmed other than peaks attributed to $Li_4Ti_5O_{12}$, which had an intensity of 1.7 when the peak intensity that corresponds to the main peak of $Li_4Ti_5O_{12}$ is defined to be 100. Further, the lithium titanate powder in this example had D50 of 0.75 μm, BET specific surface area of 6.31 m$^2$/g, $D_{BET}$ of 0.276 μm, $D_X$ of 241 nm, and $D_{BET}/D_X$ (μm/μm) small value of 1.14. The pH was 10.7.

Also, for the obtained lithium titanate powder, element concentration of Mg contained in the lithium titanate powder, and its atomic ratio with respect to Ti were measured in the same method as used in Example 5. The measurement result is shown in Table 3 as in Example 4. For the lithium titanate powder in this example, $T_{Mg}/T_{Ti}$ (A) was 0.011, $C_{Mg}/C_{Ti}$ (B) was 0.217, B/A was 19.7, D1 was 1.3, and D2 was not detected.

Using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this example are shown in Table 3. The battery obtained by using lithium titanate powder of this example as an evaluation electrode had a high initial charge-discharge capacity of 165.2 mAh/g at 25° C. and no significant decrease was seen in the discharge capacity ratio and only small decrease was seen in the charge capacity ratio even when it was charged and discharged at high current density. 3C charge capacity ratio at 25° C. indicated high value of 96%, and 2C charge capacity ratio at 0° C. indicated particularly high value of 92%.

Comparative Example 3

The lithium titanate powder for Comparative Example 3 was prepared in the same way as in Example 7, except for that the lithium titanate powder of the base material was changed to the lithium titanate powder obtained in Comparative Example 2.

For the obtained lithium titanate powder, XRD, D50 (μm), BET specific surface area (m$^2$/g), and pH were measured. Then, a peak intensity ratio of the impurities to lithium titanate measured by the XRD, BET diameter $D_{BET}$ (μm), crystallite diameter $D_X$ (nm), and ratio $D_{BET}/D_X$ (μm/μm) of $D_{BET}$ to $D_X$ were calculated. The results are shown in Table 3. From the XRD measurement result of the lithium titanate powder in this comparative example, peaks of rutile-type titanium dioxide and $Li_2TiO_3$ were confirmed other than the peaks attributed to $Li_4Ti_5O_{12}$, which had intensities of 5.8 and 2.0 respectively when the peak intensity that corresponds to the main peak of $Li_4Ti_5O_{12}$ is defined to be 100. Further, the lithium titanate powder in this comparative example had D50 of 1.80 μm, BET specific surface area of 3.13 m$^2$/g, $D_{BET}$ of 0.556 μm, $D_X$ of 77 nm, and $D_{BET}/D_X$ (μm/μm) large value of 7.22. The pH was 11.4.

Also, for the obtained lithium titanate powder, element concentration of Al contained in the lithium titanate powder, and its atomic ratio with respect to Ti were measured in the same method as used in Example 4. The measurement result is shown in Table 3 as in Example 4. For the lithium titanate powder in this comparative example, $T_{Al}/T_{Ti}$ (A) was 0.011, $C_{Al}/C_{Ti}$ (B) was 0.260, B/A was 23.6, D1 was 3.4, and D2 was not detected.

Using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this comparative example are shown in Table 3. The battery obtained by using lithium titanate powder of this comparative example as an evaluation electrode had small initial charge-discharge capacity of 158.3 mAh/g at 25° C., and significant decrease was seen in the charge capacity ratio when it was charged at high current density. 3C charge capacity ratio at 25° C. indicated low value of 74%, and 2C charge capacity ratio at 0° C. also indicated low value of 41%.

Comparative Example 4

The lithium titanate powder for Comparative Example 4 was prepared in the same way as in Example 7, except for that the lithium titanate powder of the base material was changed to the lithium titanate powder obtained in Comparative Example 2, M source was changed to magnesium sulfate heptahydrate, and the magnesium sulfate heptahydrate and lithium titanate powder obtained in Comparative Example 2 were weighed so as to achieve Mg/Ti, atomic ratio of Mg to Ti of 0.011 when mixed, and heat treatment temperature was changed to 350° C.

For the obtained lithium titanate powder, XRD, D50 (μm), BET specific surface area (m$^2$/g), and pH were measured. Then, peak intensity ratio of the impurities to lithium titanate measured by the XRD, BET diameter $D_{BET}$ (μm), crystallite diameter $D_X$ (nm), and ratio $D_{BET}/D_X$ (μm/μm) of $D_{BET}$ to $D_X$ were calculated. The results are shown in Table 3. From the XRD measurement result of the lithium titanate powder in this comparative example, peaks of rutile-type titanium dioxide and $Li_2TiO_3$ were confirmed other than peaks of $Li_4Ti_5O_{12}$, where their intensities were 6.0 and 2.0 respectively when the peak intensity that corresponds to the main peak of $Li_4Ti_5O_{12}$ is defined to be 100. Further, the lithium titanate powder in this comparative example had D50 of 1.18 μm, BET specific surface area of 3.20 m$^2$/g, D$_{BET}$ of 0.543 μm, D$_X$ of 76 nm, and D$_{BET}$/D$_X$ (μm/μm) large value of 7.15. The pH was 11.0.

Also, for the obtained lithium titanate powder, element concentration of Mg contained in the lithium titanate powder, and its atomic ratio with respect to Ti was measured in the same method as used in Example 5. The measurement result is shown in Table 3 as in Example 4. For the lithium titanate powder in this comparative example, T$_{Mg}$/T$_{Ti}$ (A) was 0.011, C$_{Mg}$/C$_{Ti}$ (B) was 0.240, B/A was 21.8, D1 was 2.1, and D2 was not detected.

Using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this comparative example are shown in Table 3. The battery obtained by using lithium titanate powder of this comparative example as an evaluation electrode had a small initial charge-discharge capacity of 159.0 mAh/g at 25° C. and significant decrease was seen in the charge capacity ratio when it was charged at high current density. 3C charge capacity ratio at 25° C. indicated low value of 73%, and 2C charge capacity ratio at 0° C. also indicated low value of 41%.

Example 13

The lithium titanate powder for Example 13 was prepared in the same way as in Example 7, except for that M source was changed to zinc acetate dihydrate, and the zinc acetate dihydrate and lithium titanate powder obtained in Example 1 were weighed so as to achieve Zn/Ti atomic ratio of Zn to Ti of 0.011 when mixed, and heat treatment temperature was changed to 400° C.

For the obtained lithium titanate powder, XRD, D50 (μm), BET specific surface area (m$^2$/g), and pH were measured. Then, a peak intensity ratio of the impurities to lithium titanate measured by the XRD, BET diameter D$_{BET}$ (μm), crystallite diameter D$_X$ (nm), and ratio D$_{BET}$/D$_X$ (μm/μm) of D$_{BET}$ to D$_X$ were calculated. The results are shown in Table 4. From the XRD measurement result of the lithium titanate powder in this example, only the peak of small amount of rutile-type titanium dioxide was confirmed other than the peaks attributed to Li$_4$Ti$_5$O$_{12}$, which had an intensity of 1.7 when the peak intensity that corresponds to the main peak of Li$_4$Ti$_5$O$_{12}$ is defined to be 100. Further, the lithium titanate powder in this example had D50 of 0.79 μm, BET specific surface area of 5.93 m$^2$/g, D$_{BET}$ of 0.293 μm, D$_X$ of 253 nm, and D$_{BET}$/D$_X$ (μm/μm) small value of 1.16. The pH was 11.3.

Also, for the obtained lithium titanate powder, element concentration of Zn contained in the lithium titanate powder, and its atomic ratio with respect to Ti were measured in the method described in "(7) Atomic ratio T$_M$/T$_{Ti}$ of M to Ti for the entire lithium titanate powder (inductively coupled plasma emission spectrometric analysis method)" and "(8) Atomic ratio C$_M$/C$_{Ti}$ of M to Ti on a particle surface of the lithium titanate powder (X-ray photoelectron spectroscopy (XPS))". The results are shown in Table 4. For the lithium titanate powder in this example, T$_{Zn}$/T$_{Ti}$ (A) was 0.011, C$_{Zn}$/C$_{Ti}$ (B) was 0.017, and B/A was 15.

Using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this example are shown in Table 4. The battery obtained by using lithium titanate powder of this example as an evaluation electrode had high initial charge-discharge capacity of 165.3 mAh/g at 25° C., and no significant decrease was seen in the discharge capacity ratio and only small decrease was seen in the charge capacity ratio even when it was charged and discharged at high current density. 3C charge capacity ratio at 25° C. indicated high value of 96%, and 2C charge capacity retention at 0° C. indicated particularly high value of 89%.

Example 14

The lithium titanate powder for Example 14 was prepared in the same way as in Example 7, except for that M source was changed to indium sulfate n-hydrate (95%), and the indium sulfate n-hydrate (95%) and the lithium titanate powder obtained in Example 1 were weighed so as to achieve In/Ti, an atomic ratio of In to Ti of 0.011 when mixed, and heat treatment temperature was changed to 400° C.

For the obtained lithium titanate powder, XRD, D50 (μm), BET specific surface area (m$^2$/g), and pH were measured. Then, a peak intensity ratio of the impurities to lithium titanate measured by the XRD, BET diameter D$_{BET}$ (μm), crystallite diameter D$_X$ (nm), and ratio D$_{BET}$/D$_X$ (μm/μm) of D$_{BET}$ to D$_X$ were calculated. The results are shown in Table 4. From the XRD measurement result of the lithium titanate powder in this example, only the peak of the small amount of rutile-type titanium dioxide was confirmed other than the peaks attributed to Li$_4$Ti$_5$O$_{12}$, which had an intensity of 1.7 when the peak intensity that corresponds to the main peak of Li$_4$Ti$_5$O$_{12}$ is defined to be 100. Further, the lithium titanate powder in this example had D50 of 0.77 μm, BET specific surface area of 6.02 m$^2$/g, D$_{BET}$ of 0.289 D$_X$ of 247 nm, and D$_{BET}$/D$_X$ (μm/μm) small value of 1.17. The pH was 10.8.

Also, for the obtained lithium titanate powder, element concentration of In contained in the lithium titanate powder, and its atomic ratio with respect to Ti were measured in the same method as used in Example 4. The results are shown in Table 4 as in Example 4. For the lithium titanate powder in this example, T$_{In}$/T$_{Ti}$ (A) was 0.011, C$_{In}$/C$_{Ti}$ (B) was 0.158, and B/A was 14.4.

Using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this example are shown in Table 4. The battery obtained by using lithium titanate powder of this example as an evaluation electrode had high initial charge-discharge capacity of 166.4 mAh/g at 25° C., and no significant decrease was seen in the discharge capacity ratio and only small decrease was seen in the charge capacity ratio even when it was charged and discharged at high current density. 3C charge capacity ratio at 25° C.

indicated high value of 96%, and the 2C charge capacity ratio at 0° C. indicated particularly high value of 91%.

Example 15

The lithium titanate powder for Example 15 was prepared in the same way as in Example 7, except for that M source was changed to gallium (III) acetylacetone, and the gallium (III) acetylacetone and lithium titanate powder obtained in Example 1 were weighed so as to achieve Ga/Ti an atomic ratio of Ga to Ti of 0.011 when mixed.

For the obtained lithium titanate powder, XRD, D50 (μm), BET specific surface area (m²/g), and pH were measured. Then, a peak intensity ratio of impurities to lithium titanate measured by the XRD, BET diameter $D_{BET}$ (μm), crystallite diameter $D_X$ (nm), and ratio $D_{BET}/D_X$ (μm/μm) of $D_{BET}$ to $D_X$ were calculated. The results are shown in Table 4. From the XRD measurement result of the lithium titanate powder in this example, only the peak of the small amount of rutile-type titanium dioxide was confirmed other than peaks to $Li_4Ti_5O_{12}$, which had an intensity of 1.7 when the peak intensity that corresponds to the main peak of $Li_4Ti_5O_{12}$ is defined to be 100. Further, the lithium titanate powder in this example had D50 of 0.80 μm, BET specific surface area of 5.60 m²/g, $D_{BET}$ of 0.311 μm, $D_X$ of 245 nm, and $D_{BET}/D_X$ (μm/μm) small value of 1.27. The pH was 11.2.

Also, for the obtained lithium titanate powder, element concentration of Ga contained in the lithium titanate powder, and its atomic ratio with respect to Ti were measured in the same method as used in Example 14. The results are shown in Table 4 as in Example 14. For the lithium titanate powder in this example, $T_{Ga}/T_{Ti}$ (A) was 0.011, $C_{Ga}/C_{Ti}$ (B) was 0.029, and B/A was 2.6.

Using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this example are shown in Table 4. The battery obtained by using lithium titanate powder of this example as an evaluation electrode had high initial charge-discharge capacity of 165.1 m Ah/g at 25° C. and no significant decrease was seen in the discharge capacity ratio and only small decrease was seen in the charge capacity ratio even when it was charged and discharged at high current density. 3C charge capacity ratio at 25° C. indicated high value of 96%, and 2C charge capacity ratio at 0° C. indicated particularly high value of 89%.

Example 16

The lithium titanate powder for Example 16 was prepared in the same way as in Example 7, except for that M source was changed to calcium carbonate, and the calcium carbonate and lithium titanate powder obtained in Example 1 were weighed so as to achieve Ca/Ti atomic ratio of Ca to Ti of 0.011 when mixed, and heat treatment temperature was changed to 400° C.

For the obtained lithium titanate powder, XRD, D50 (μm), BET specific surface area (m²/g), and pH were measured. Then, a peak intensity ratio of impurities to lithium titanate measured by the XRD, BET diameter $D_{BET}$ (μm), crystallite diameter $D_X$ (nm), and ratio $D_{BET}/D_X$ (μm/μm) of $D_{BET}$ to $D_X$ were calculated. The results are shown in Table 4. From the XRD measurement result of the lithium titanate powder in this example, only the peak of the small amount of rutile-type titanium dioxide was confirmed other than the peaks attributed to $Li_4Ti_5O_{12}$, which had an intensity of 1.7 when the peak intensity that corresponds to the main peak of $Li_4Ti_5O_{12}$ is defined to be 100. Further, the lithium titanate powder in this example had D50 of 0.81 μm, BET specific surface area of 5.50 m²/g, $D_{BET}$ of 0.316 μm, $D_X$ of 260 nm, and $D_{BET}/D_X$ (μm/μm) small value of 1.22. The pH was 11.1.

Also, for the obtained lithium titanate powder, element concentration of Ca contained in the lithium titanate powder, and its atomic ratio with respect to Ti were measured in the method described in "(7) Atomic ratio $T_M/T_{Ti}$ of M to Ti for the entire lithium titanate powder (inductively coupled plasma emission spectrometric analysis method)". The results are shown in Table 4. For the lithium titanate powder in this example, $T_{Ca}/T_{Ti}$ (A) was 0.011.

Using the obtained lithium titanate powder, an evaluation electrode and coin battery were fabricated in the same way as in Example 1, and electrochemical characteristics (initial charge-discharge characteristics, input-output performance, and low-temperature characteristics) of the coin battery were evaluated in the same method as used in Example 1. The discharge capacity in the third cycle (evaluation electrode capacity), 3C charge capacity ratio, and 2C charge capacity ratio at 0° C. of the coin battery in this example are shown in Table 4. The battery obtained by using lithium titanate powder of this example as an evaluation electrode had high initial charge-discharge capacity of 165.2 mAh/g at 25° C. and no significant decrease was seen in the discharge capacity ratio and only small decrease was seen in the charge capacity ratio even when it was charged and discharged at high current density. 3C charge capacity ratio at 25° C. indicated high value of 94%, and 2C charge capacity ratio at 0° C. was 72%.

TABLE 1

| | | Lithium titanate powder | | | | | | | | | Evaluating electrode | | |
|---|---|---|---|---|---|---|---|---|---|---|---|---|---|
| | | XRD peak intensity | | | | BET | | | | | | 3 C | 0° C. 2 C |
| | Mixed powder D95 (μm) | $Li_4Ti_5O_{12}$ | Anatase-type titanium dioxide | Rutile-type titanium dioxide | $Li_2TiO_3$ | D50 (μm) | specific surface area (m²/g) | $D_{BET}$ (μm) | $D_X$ (nm) | $D_{BET}/D_X$ (μm/μm) | pH | 3rd cycle discharge capacity (mAh/g) | charge capacity ratio (%) | charge capacity ratio (%) |
| Example 1 | 0.73 | 100 | 0 | 1.7 | 0 | 0.75 | 6.36 | 0.27 | 257 | 1.06 | 11.3 | 165.6 | 95% | 72% |
| Example 2 | 0.73 | 100 | 0 | 2.5 | 0 | 18.60 | 3.96 | 0.44 | 412 | 1.07 | 11.3 | 166.7 | 90% | 70% |
| Example 3 | 3.69 | 100 | 0 | 2.1 | 0 | 0.87 | 4.61 | 0.38 | 212 | 1.78 | 11.5 | 167.0 | 87% | 62% |

TABLE 1-continued

| | Lithium titanate powder | | | | | | | | | | | Evaluating electrode | | |
|---|---|---|---|---|---|---|---|---|---|---|---|---|---|---|
| | | XRD peak intensity | | | | BET | | | | | | | 3 C | 0° C. 2 C |
| | Mixed powder D95 (μm) | Li₄Ti₅O₁₂ | Anatase-type titanium dioxide | Rutile-type titanium dioxide | Li₂TiO₃ | D50 (μm) | specific surface area (m²/g) | D_BET (μm) | D_X (nm) | D_BET/D_X (μm/μm) | pH | 3rd cycle discharge capacity (mAh/g) | charge capacity ratio (%) | charge capacity ratio (%) |
| Comparative Example 1 | 6.00 | 100 | 0 | 0 | 0 | 1.26 | 2.76 | 0.63 | 193 | 3.26 | 11.3 | 170.5 | 65% | 34% |
| Comparative Example 2 | 31.00 | 100 | 0 | 6.0 | 2.0 | 1.12 | 3.22 | 0.54 | 76 | 7.11 | 11.6 | 157.2 | 72% | 32% |

TABLE 2

| | Lithium titanate powder containing metal element M | | | | | | | | | | |
|---|---|---|---|---|---|---|---|---|---|---|---|
| | | | XRD peak intensity | | | | BET | | | | Atomic concentration of |
| | Mixed powder D95 (μm) | Metal element M | Li₄Ti₅O₁₂ | Anatase-type titanium dioxide | Rutile-type titanium dioxide | Li₂TiO₃ | D50 (μm) | specific surface area (m²/g) | D_BET (μm) | D_X (nm) | D_BET/D_X (μm/μm) | metal element M (entire powder) T_M/T_Ti (A) |
| Example 4 | 3.22 | Al | 100 | 0 | 0 | 0 | 0.96 | 4.15 | 0.419 | 257 | 1.63 | 0.030 |
| Example 5 | 3.43 | Mg | 100 | 0 | 0.5 | 0 | 0.91 | 4.90 | 0.355 | 238 | 1.49 | 0.014 |
| Example 6 | 3.32 | Al | 100 | 0 | 0 | 0 | 0.92 | 4.45 | 0.391 | 251 | 1.56 | 0.030 |

| | Lithium titanate powder containing metal element M | | | | | | |
|---|---|---|---|---|---|---|---|
| | Atomic concentration of metal element M (particle surface) C_M/C_Ti (B) | Atomic concentration ratio of metal element M (particle surface/inner particle) D1/D2 (TEM/TEM) | Atomic concentration ratio of metal element M (particle surface/entire powder) B/A (XPS/ICP) | pH | Evaluation electrode | | |
| | | | | | 3rd cycle discharge capacity (mAh/g) | 3 C charge capacity ratio (%) | 0° C. 2 C charge capacity ratio (%) |
| Example 4 | 0.032 | 2.0 | 1.1 | 11.2 | 165.3 | 89% | 75% |
| Example 5 | 0.018 | 1.3 | 1.3 | 10.9 | 165.5 | 89% | 77% |
| Example 6 | 0.160 | 3.3 | 5.3 | 11.3 | 165.1 | 90% | 80% |

TABLE 3

| | | | Lithium titanate powder containing metal element M | | | | | | | | |
|---|---|---|---|---|---|---|---|---|---|---|---|
| | | | | XRD peak intensity | | | | BET specific | | | |
| | Lithium-titanate powder | Metal element M | Li₄Ti₅O₁₂ | Anatase-type titanium dioxide | Rutile-type titanium dioxide | Li₂TiO₃ | D50 (μm) | surface area (m²/g) | D_BET (μm) | D_X (nm) | D_BET/D_X (μm/μm) |
| Example 7 | Example 1 | Al | 100 | 0 | 1.7 | 0 | 0.78 | 5.75 | 0.302 | 273 | 1.11 |
| Example 8 | | Al | 100 | 0 | 1.7 | 0 | 0.80 | 5.61 | 0.310 | 252 | 1.23 |
| Example 9 | | Al | 100 | 0 | 1.7 | 0 | 0.77 | 5.88 | 0.296 | 263 | 1.12 |
| Example 10 | | Al | 100 | 0 | 1.7 | 0 | 0.77 | 5.63 | 0.309 | 278 | 1.11 |
| Example 11 | | Al | 100 | 0 | 1.7 | 0 | 0.76 | 6.27 | 0.277 | 244 | 1.14 |
| Example 12 | | Mg | 100 | 0 | 1.7 | 0 | 0.75 | 6.31 | 0.276 | 241 | 1.14 |
| Comparative Example 3 | Comparative Example 2 | Al | 100 | 0 | 5.8 | 2 | 1.80 | 3.13 | 0.556 | 77 | 7.22 |
| Comparative Example 4 | | Mg | 100 | 0 | 6.0 | 2 | 1.18 | 3.20 | 0.543 | 76 | 7.15 |

TABLE 3-continued

Lithium titanate powder containing metal element M

| | Atomic concentration of metal element M (entire powder) $T_M/T_{Ti}$ (A) | Atomic concentration of metal element M (particle surface) $C_M/C_{Ti}$ (B) | Atomic concentration ratio of metal element M (particle surface/ inner particle) D1/D2 (TEM/TEM) | Atomic concentration ratio of metal element M (particle surface/ entire powder) B/A (XPS/ICP) | pH | Evaluation electrode | | |
|---|---|---|---|---|---|---|---|---|
| | | | | | | 3rd cycle discharge capacity (mAh/g) | 3 C charge capacity ratio (%) | 0° C. 2 C charge capacity ratio (%) |
| Example 7 | 0.011 | 0.100 | 2.7/Not detected. | 9.1 | 11.2 | 165.5 | 96% | 89% |
| Example 8 | 0.023 | 0.190 | 3.2/Not detected. | 8.3 | 11.3 | 165.0 | 96% | 90% |
| Example 9 | 0.011 | 0.180 | 2.4/Not detected. | 16.4 | 11.3 | 165.6 | 96% | 90% |
| Example 10 | 0.011 | 0.120 | 2.2/Not detected. | 10.9 | 11.1 | 165.3 | 97% | 92% |
| Example 11 | 0.011 | 0.215 | 1.2/Not detected. | 19.6 | 9.5 | 166.8 | 96% | 90% |
| Example 12 | 0.011 | 0.217 | 1.3/Not detected. | 19.7 | 10.7 | 165.2 | 96% | 92% |
| Comparative Example 3 | 0.011 | 0.260 | 3.4/Not detected. | 23.6 | 11.4 | 158.3 | 74% | 41% |
| Comparative Example 4 | 0.011 | 0.240 | 2.1/Not detected. | 21.8 | 11.0 | 159.0 | 73% | 41% |

TABLE 4

Lithium titanate powder containing metal element M

| | Lithium-titanate powder | Metal element M | XRD peak intensity | | | | D50 (μm) | BET specific surface area (m²/g) | $D_{BET}$ (μm) | $D_X$ (nm) | $D_{BET}/D_X$ (μm/μm) |
|---|---|---|---|---|---|---|---|---|---|---|---|
| | | | $Li_4Ti_5O_{12}$ | Anatase-type titanium dioxide | Rutile-type titanium dioxide | $Li_2TiO_3$ | | | | | |
| Example 13 | Example 1 | Zn | 100 | 0 | 1.7 | 0 | 0.79 | 5.93 | 0.293 | 253 | 1.16 |
| Example 14 | | In | 100 | 0 | 1.7 | 0 | 0.77 | 6.02 | 0.289 | 247 | 1.17 |
| Example 15 | | Ga | 100 | 0 | 1.7 | 0 | 0.80 | 5.60 | 0.311 | 245 | 1.27 |
| Example 16 | | Ca | 100 | 0 | 1.7 | 0 | 0.81 | 5.50 | 0.316 | 260 | 1.22 |

Lithium titanate powder containing metal element M

| | Atomic concentration of metal element M (entire powder) $T_M/T_{Ti}$ (A) | Atomic concentration of metal element M (particle surface) $C_M/C_{Ti}$ (B) | Atomic concentration ratio of metal element M (particle surface/ entire powder) B/A (XPS/ICP) | pH | Evaluation electrode | | |
|---|---|---|---|---|---|---|---|
| | | | | | 3rd cycle discharge capacity (mAh/g) | 3 C charge capacity ratio (%) | 0° C. 2 C charge capacity ratio (%) |
| Example 13 | 0.011 | 0.017 | 1.5 | 11.3 | 165.3 | 96% | 89% |
| Example 14 | 0.011 | 0.158 | 14.4 | 10.8 | 166.4 | 96% | 91% |
| Example 15 | 0.011 | 0.029 | 2.6 | 11.2 | 165.1 | 96% | 89% |
| Example 16 | 0.011 | — | — | 11.1 | 165.2 | 94% | 72% |

An electrode obtained by using a lithium titanate powder of Examples 1 to 16 had a large initial charge-discharge capacity and exhibited a small drop in the charge-discharge capacity ratio even when it was charged and discharged at high current density. In other words, the electrode had great input-output performance. On the other hand, although the electrode obtained by using lithium titanate powder of Comparative Example 1, which had a large crystallite diameter $D_X$ and also a large $D_{BET}/D_X$, had a large initial charge-discharge capacity, its input-output performance was unsatisfactory. As for the electrode obtained by using a lithium titanate powder having a small crystallite diameter $D_X$ of Comparative Example 2, in addition to its unsatisfactory input-output performance, its initial charge-discharge capacity was also small. As apparent from these results, the lithium titanate powder in the present invention is an active material that has large initial charge-discharge capacity and superior input-output performance.

Moreover, an electrode obtained by using lithium titanate powder of Examples 4 to 15 containing M, which is a different element other than Li, Ti and O, exhibited high 2C charge capacity ratio at 0° C. and great low-temperature characteristics. On the other hand the electrode obtained by using lithium titanate powder of Comparative Examples 3 and 4 that had a large $D_{BET}/D_X$ although crystallite diameter $D_X$ was large, and containing M as a different metal element, showed low 2C charge capacity ratio at 0° C. As apparent from these results, the lithium titanate powder in the present invention containing the M as a different metal element is an active material that has large initial charge-discharge capacity and great input-output performance at room temperature, and what is more, has great input performance even at low temperature.

For Examples 1 to 16 above, using metal lithium as a counter electrode and for each evaluation electrode obtained from the examples, each of the characteristics was evaluated for the case where lithium absorption and release were performed. In an energy storage device, for which an active material containing the lithium titanate powder of the present invention is applied, a satisfactory result is required in all of these characteristics. Therefore, from the results of Examples 1 to 16 above, it can be considered that the lithium titanate powder of the present invention and an active material containing the same are preferable for an electrode of energy storage devices, specifically, for an electrode of hybrid capacitors and lithium batteries (lithium primary batteries and lithium secondary batteries (lithium-ion secondary batteries)).

What is claimed is:

1. A lithium titanate powder comprising $Li_4Ti_5O_{12}$ as a main component, wherein,
    when a volume surface diameter calculated from a specific surface area determined by a BET method is represented as $D_{BET}$, and when a crystallite diameter calculated from a half-peak width of a peak for a (111) plane of $Li_4Ti_5O_{12}$ by a Scherrer equation is represented as $D_X$, $D_{BET}$ is 0.1 to 0.6 μm, $D_X$ is larger than 80 nm, a $D_{BET}/D_X$ (μm/μm) ratio of $D_{BET}$ to $D_X$ is 3 or less, and
    a peak of $Li_2TiO_3$ is not detected by X-ray diffraction.

2. The lithium titanate powder according to claim 1, wherein $D_{BET}/D_X$ (μm/μm), the ratio of $D_{BET}$ to $D_X$ is 2 or less.

3. The lithium titanate powder according to claim 1, wherein $D_X$ is 500 nm or less.

4. The lithium titanate powder according to claim 1, further comprising M, wherein M is at least one type of metal element selected from the group consisting of a group 2 element, a group 12 element, and a group 13 element.

5. The lithium titanate powder according to claim 4, wherein the M is at least one type of metal element selected from the group consisting of Mg, Zn, Al, Ga, and In.

6. The lithium titanate powder according to claim 4, wherein $T_M/T_{Ti}$, an atomic ratio of the M to Ti, for the entire lithium titanate powder measured by the inductively coupled plasma emission spectrometric analysis method is 0.001 to 0.05.

7. The lithium titanate powder according to claim 4, wherein, in a cross-sectional analysis of a lithium titanate particle using a scanning transmission electron microscope, when an element concentration of the M measured by an energy dispersive X-ray spectroscopy at a 5 nm inner position from a surface of the lithium titanate particle along a straight line drawn vertically to a tangent of the lithium titanate particle surface is D1 (atm %) and when an element concentration of the M measured by an energy dispersive X-ray spectroscopy at a 100 nm inner position from the lithium titanate particle surface along the straight line is D2 (atm %), the D1 and D2 satisfy a formula (I)

$$D1 > D2 \qquad (I).$$

8. The lithium titanate powder according to claim 4, further comprising a fluorine element.

9. The lithium titanate powder according to claim 4, suitable for use in an electrode of an energy storage device.

10. An active material comprising the lithium titanate powder according to claim 4.

11. An energy storage device comprising the active material according to claim 10.

12. A lithium-ion secondary battery comprising the active material according to claim 10.

13. A hybrid capacitor comprising the active material according to claim 10.

14. The lithium titanate powder according to claim 1, further comprising fluorine.

15. The lithium titanate powder according to claim 1, suitable for use in an electrode of an energy storage device.

16. An active material comprising the lithium titanate powder according to claim 1.

17. An energy storage device comprising the active material according to claim 16.

18. A lithium-ion secondary battery comprising the active material according to claim 16.

19. A hybrid capacitor comprising the active material according to claim 16.

20. A lithium titanate powder comprising $Li_4Ti_5O_{12}$ as a main component, wherein,
    when a volume surface diameter calculated from a specific surface area determined by a BET method is represented as $D_{BET}$, and when a crystallite diameter calculated from a half-peak width of a peak for a (111) plane of $Li_4Ti_5O_{12}$ by a Scherrer equation is represented as $D_X$, $D_{BET}$ is 0.1 to 0.6 μm, $D_X$ is larger than 80 nm, and a $D_{BET}/D_X$ (μm/μm) ratio of $D_{BET}$ to $D_X$ is 3 or less,
    the lithium titanate powder further comprises M wherein M is at least one type of metal element selected from the group consisting of a group 2 element, a group 12 element, and a group 13 element, and
    in a cross-sectional analysis of a lithium titanate particle using a scanning transmission electron microscope, when an element concentration of the M measured by an energy dispersive X-ray spectroscopy at a 5 nm inner position from a surface of the lithium titanate particle along a straight line drawn vertically to a tangent of the lithium titanate particle surface is D1 (atm %) and when an element concentration of the M measured by an energy dispersive X-ray spectroscopy at a 100 nm inner position from the lithium titanate particle surface along the straight line is D2 (atm %), a ratio D1/D2 of the D1 to the D2 satisfies a formula (II)

$$D1/D2 \geq 5 \qquad (II).$$

* * * * *